(12) United States Patent
Ebihara et al.

(10) Patent No.: US 9,267,841 B2
(45) Date of Patent: Feb. 23, 2016

(54) COLOR MEASUREMENT DEVICE AND IMAGE FORMING APPARATUS

(75) Inventors: Shun-ichi Ebihara, Suntou-gun (JP); Hiroshi Kita, Mishima (JP); Tatsuya Kobayashi, Suntou-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 454 days.

(21) Appl. No.: 13/523,807

(22) Filed: Jun. 14, 2012

(65) Prior Publication Data
US 2012/0327405 A1    Dec. 27, 2012

(30) Foreign Application Priority Data

Jun. 23, 2011    (JP) .................................. 2011-139471

(51) Int. Cl.
G02F 1/35    (2006.01)
G02F 1/03    (2006.01)
(Continued)

(52) U.S. Cl.
CPC ............... *G01J 3/0291* (2013.01); *G01J 3/027* (2013.01); *G01J 3/0264* (2013.01); *G01J 3/0297* (2013.01); *G01J 3/10* (2013.01); *G01J 3/36* (2013.01); *G01J 3/462* (2013.01); *G01J 3/463* (2013.01); *G01J 3/501* (2013.01); *G01J 3/502* (2013.01); *G03G 15/5062* (2013.01);
(Continued)

(58) Field of Classification Search
CPC ................. G01J 3/10; G01J 3/46; G01J 3/50; G01J 3/501; G01J 3/502; G01J 3/504–3/506; G01J 3/508; G01J 3/524; G01J 2003/2869; G01N 21/255; G01N 21/643; A61B 5/0075

USPC .................... 356/300, 328, 305, 243.1–243.8
See application file for complete search history.

(56) References Cited

U.S. PATENT DOCUMENTS 4,047,032 A * 9/1977 Judge et al. ................ 250/338.5
4,742,030 A   5/1988 Masaki et al.
(Continued)

FOREIGN PATENT DOCUMENTS

EP    1260878    11/2002
JP    2001-194856    7/2001
(Continued)

OTHER PUBLICATIONS

U.S. Appl. No. 13/551,156, filed Jul. 17, 2012 by Shun-ichi Ebihara.
(Continued)

*Primary Examiner* — Tarifur Chowdhury
*Assistant Examiner* — Sunghee Y Gray
(74) *Attorney, Agent, or Firm* — Fitzpatrick, Cella, Harper & Scinto

(57) ABSTRACT

The color measurement device and an image forming apparatus using the same includes a light source for irradiating a color measurement object with white light; a diffraction grating for dispersing the light reflected from the color measurement object; and a line sensor formed of multiple pixels that generate an electric signal corresponding to the intensity of the light dispersed by the diffraction grating, wherein the light source includes a light-emitting diode having a peak value of emission intensity in a wavelength zone of 380 nm to 420 nm, and a plural types of fluorescent members each having a peak value of fluorescence intensity in a wavelength zone of 420 nm to 730 nm.

7 Claims, 15 Drawing Sheets

(51) Int. Cl.
  *G02F 1/29* (2006.01)
  *G02F 1/33* (2006.01)
  *G01J 3/02* (2006.01)
  *G01J 3/10* (2006.01)
  *G01J 3/36* (2006.01)
  *G01J 3/46* (2006.01)
  *G03G 15/00* (2006.01)
  *G01J 3/50* (2006.01)

(52) U.S. Cl.
  CPC .......... *G01J 2003/503* (2013.01); *G03G 2215/00586* (2013.01); *G03G 2215/0132* (2013.01); *G03G 2215/0164* (2013.01)

(56) References Cited

U.S. PATENT DOCUMENTS

| | | | |
|---|---|---|---|
| 4,802,186 A * | 1/1989 | Gibson et al. | 372/92 |
| 6,351,308 B1 | 2/2002 | Mestha | 356/402 |
| 6,556,300 B2 | 4/2003 | Tandon et al. | 356/419 |
| 6,567,170 B2 | 5/2003 | Tandon et al. | 356/406 |
| 6,621,576 B2 | 9/2003 | Tandon et al. | 356/320 |
| 6,650,416 B2 | 11/2003 | Tandon et al. | 356/420 |
| 6,690,471 B2 | 2/2004 | Tandon et al. | 356/420 |
| 7,240,839 B2 * | 7/2007 | Jung et al. | 235/454 |
| 7,269,369 B2 | 9/2007 | Tezuka et al. | 399/72 |
| 7,391,060 B2 | 6/2008 | Oshio | |
| 7,697,136 B2 | 4/2010 | Imura | 356/326 |
| 7,982,908 B2 | 7/2011 | Kita et al. | 358/1.9 |
| 8,451,443 B2 | 5/2013 | Takizawa | |
| 2001/0004284 A1 * | 6/2001 | Fukuda et al. | 355/29 |
| 2005/0213958 A1 * | 9/2005 | Uemura | 396/182 |
| 2007/0046936 A1 * | 3/2007 | Mauzy et al. | 356/328 |
| 2008/0029779 A1 | 2/2008 | Hata et al. | 257/98 |
| 2009/0040354 A1 * | 2/2009 | Takanashi | 348/308 |
| 2009/0090843 A1 * | 4/2009 | Lim et al. | 250/205 |
| 2010/0117941 A1 * | 5/2010 | Schulz | 345/88 |
| 2011/0217052 A1 | 9/2011 | Usui et al. | 399/15 |

FOREIGN PATENT DOCUMENTS

| | | |
|---|---|---|
| JP | 2003-014545 | 1/2003 |
| JP | 2006-049799 A | 2/2006 |
| JP | 2007-093273 | 4/2007 |
| JP | 2008-298579 | 12/2008 |
| JP | 4541529 | 9/2010 |
| JP | 2011-028171 A | 2/2011 |

OTHER PUBLICATIONS

U.S. Appl. No. 13/528,597, filed Jun. 20, 2012 by Hiroshi Kita.

* cited by examiner

COLOR MEASUREMENT DEVICE AND IMAGE FORMING APPARATUS

BACKGROUND OF THE INVENTION

1. Field of the Invention

The present invention relates to a color measurement device which measures the color of a patch for color measurement formed on a color measurement object, and an image forming apparatus, such as copying machines and printers of an ink-jet type and an electrophotographic type, provided with the color measurement device.

2. Description of the Related Art

In recent years, color image forming apparatuses such as a color printer and a color copying machine are required to enhance an image quality of an output image. Particularly, the stability of an image gradation or an image color gives large influence on a quality of an image. However, in the color printer, a color tone of an obtained image results in changing the color tone due to a change of an environment such as temperature and humidity and service in a long period. Accordingly, in order to realize a stable color tone, it is necessary to detect the color tone of the image by using a color measurement device, and to feed back the color measurement result to an image formation condition of the image forming apparatus.

Conventionally, the following types of color measurement devices are known as the color measurement device which measures the color tone of a color measurement object such as printed matter. First, a filter type (tristimulus-value direct-reading type) color measurement device is known which irradiates the color measurement object with white light, receives the reflected light with a photo-sensor through color filters of RGB, and thereby measures the intensity of every color component. In addition, a spectroscopic color measurement device is known which disperses the wavelength of the reflected light by using a diffraction grating, a prism or the like, then detects the intensity of every wavelength with a line sensor, and determines the spectral reflectivity of the color measurement object by performing a calculation in consideration of the wavelength distribution of the detected dispersed light, the wavelength distribution of light of a light source, a spectral sensitivity of a sensor and the like.

FIG. 16 illustrates a structure of a spectral color measurement device.

A spectral color measurement device 100 has a line sensor 101 which detects the dispersed light which has been dispersed. A light source 102 is formed of a white LED, a halogen lamp, an LED of three colors of RGB or the like. The light source 102 has the luminescence wavelength distribution which covers the whole visible light.

White light 105 which has been emitted from the light source 102 is incident on a color measurement object 104 at an illuminating angle of approximately 45 degrees, and turns into scattered light according to optical absorption properties of the color measurement object. A part of scattered light 106 is taken in a lens 107 to turn into parallel light, and then is incident on a diffraction grating 108 at an incidence angle of 0 degree, thereby being dispersed. The dispersed light which has been dispersed is incident on the line sensor 101.

Lights having different wavelength ranges are incident on pixels of the line sensor 101, respectively, and the intensity of every wavelength of a dispersed light which has been reflected by the color measurement object 104 is obtained from an output obtained from each pixel.

In such a spectral color measurement device, a tungsten lamp or the like which has an output in a wide wavelength zone has conventionally been used as a light source. However, a fine distortion of an optical system, which is produced by heat emanated from a light source, results in lowering the color measurement precision, and there are requirements for the color measurement device to be miniaturized and the like. Then, in recent years, a white LED which is small, can provide high luminance and generates a small amount of heat has been desired to be used as a light source. A conventionally well-known white LED includes a blue light-emitting chip, for instance, formed of an InGaN system, and a yellow fluorescent member, and emits light having a luminescence spectrum as is illustrated in FIG. 9. Light to be emitted from the blue light-emitting chip to be used here has a central wavelength of generally approximately 450 nm, and fluorescent light to be emitted from the yellow fluorescent member used here has a central wavelength of approximately 570 nm.

However, on the other hand, when measuring the color of the color measurement object such as printed matter with these color measurement devices, it is desired to measure the intensity in a wavelength zone that is equal to or more than 380 nm, or equal to or less than 780 nm in strict color measurement or in a wavelength zone of 400 nm to 700 nm even in the case of simple color measurement, as is described in JIS 28722, for instance. When the general white LED described previously is used as a light source, such a problem occurs that S/N properties are lowered and exact color measurement cannot be performed, because outputs in the vicinity of 400 nm and in the vicinity of 700 nm, and an output in a region (portion A in FIG. 9) between a luminescence center and a fluorescence center are low.

With addressing problems, in Japanese Patent Application Laid-Open No. 2007-093273, a precision for a signal in the wavelength region in which the output is low is compensated by using a calculation technique such as interpolation and extrapolation based on reflection characteristics which have been determined separately. In addition, in Japanese Patent Application Laid-Open No. 2003-014545 and Japanese Patent Application Laid-Open No. 2008-298579, an output from the above-described wavelength zone is obtained by using a plurality of LED packages.

However, the calculation technique which calculates reflection characteristics and is proposed in Japanese Patent Application Laid-Open No. 2007-093273 is different from a method of calculating original signal components, and still has a difficulty in a viewpoint of the accuracy of color measurement. In addition, even though the color tone of the image is detected in such a state that a color measurement precision thus cannot be secured, and the color tone is fed back to a process condition of the image forming apparatus, the stability of the color tone cannot be expected.

On the other hand, the method proposed in Japanese Patent Application Laid-Open No. 2003-014545, or Japanese Patent Application Laid-Open No. 2008-298579 results in causing such a problem again that the color measurement precision results in being lowered due to the increase of calorific value or the size of the color measurement device becomes large, because a plurality of LEDs is used.

SUMMARY OF THE INVENTION

Accordingly, an object of the present invention is to further enhance the color measurement precision for a signal in a low-output wavelength region (region in the vicinity of wavelength of 400 nm).

Another object of the present invention is to further enhance the precision of the color measurement with respect to a wide wavelength zone with a simple structure.

A further object of the present invention is to provide a color measurement device which includes a light source for irradiating a color measurement object with white light; a spectral unit for dispersing the light reflected from the color measurement object; and a light detection unit formed of multiple pixels that generate an electric signal corresponding to the intensity of the light dispersed by the spectral unit, wherein the light source includes a light-emitting diode having a peak value of emission intensity in a wavelength zone that is equal to or more than 380 nm, or equal to or less than 420 nm.

A further object of the present invention is to provide a color measurement device which includes a light source for irradiating a color measurement object with white light; a spectral unit for dispersing the light reflected from the color measurement object; and a light detection unit formed of multiple pixels that generate an electric signal corresponding to the intensity of the light dispersed by the spectral unit, wherein the light source includes a plural types of fluorescent members each having a peak value of fluorescence intensity in a wavelength zone that is equal to or more than 420 nm, or equal to or less than 730 nm.

A further object of the present invention is to provide a color measurement device which includes a light source for irradiating a color measurement object with white light; a spectral unit for dispersing the light reflected from the color measurement object; and a light detection unit formed of multiple pixels that generate an electric signal corresponding to the intensity of the light dispersed by the spectral unit, wherein the light source includes a light-emitting diode having a peak value of the emission intensity in a wavelength zone that is equal to or more than 380 nm, or equal to or less than 420 nm, and a plural types of fluorescent members each having a peak value of fluorescence intensity in a wavelength zone that is equal to or more than 420 nm, or equal to or less than 730 nm.

A further object of the present invention is to provide an image forming apparatus that includes an image forming portion for forming an image or a patch for color measurement corresponding to a signal on a recording material; and a color measurement device which includes a light source for irradiating a color measurement object with white light; a spectral unit for dispersing the light reflected from the color measurement object; and a light detection unit formed of multiple pixels which generate an electric signal corresponding to the intensity of the light dispersed by the spectral unit, wherein the light source includes a light-emitting diode having a peak value of emission intensity in a wavelength zone that is equal to or more than 380 nm, or equal to or less than 420 nm.

A further object of the present invention is to provide an image forming apparatus that includes an image forming portion for forming an image or a patch for color measurement corresponding to a signal on a recording material; and a color measurement device which includes a light source for irradiating a color measurement object with white light; a spectral unit for dispersing the light reflected from the color measurement object; and a light detection unit formed of multiple pixels which generate an electric signal corresponding to the intensity of the light dispersed by the spectral unit, wherein the light source includes a plural types of fluorescent members each having a peak value of fluorescence intensity in a wavelength zone that is equal to or more than 420 nm, or equal to or less than 730 nm.

A further object of the present invention is to provide an image forming apparatus that includes: an image forming portion for forming an image or a patch for color measurement corresponding to a signal on a recording material; and a color measurement device which includes a light source for irradiating a color measurement object with white light; a spectral unit for dispersing the light reflected from the color measurement object; and a light detection unit formed of multiple pixels which generate an electric signal corresponding to the intensity of the light dispersed by the spectral unit, wherein the light source includes a light-emitting diode having a peak value of emission intensity in a wavelength zone that is equal to or more than 380 nm, or equal to or less than 420 nm, and a plural types of fluorescent members each having a peak value of the fluorescence intensity in a wavelength zone that is equal to or more than 420 nm, or equal to or less than 730 nm.

A still further object of the present invention will become clear according to the following detailed description with reference to the drawings.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Embodiments according to the present invention will be illustratively described in detail below with reference to the drawings. However, the dimensions, materials, shapes, relative arrangements and the like of components which will be described in the following embodiments can be appropriately changed according to the structure of the device to which the present invention is applied and various conditions. Accordingly, the above descriptions in the following embodiments should not limit the scope of this invention only to those, unless otherwise specified.

First Embodiment

Figure 1A:
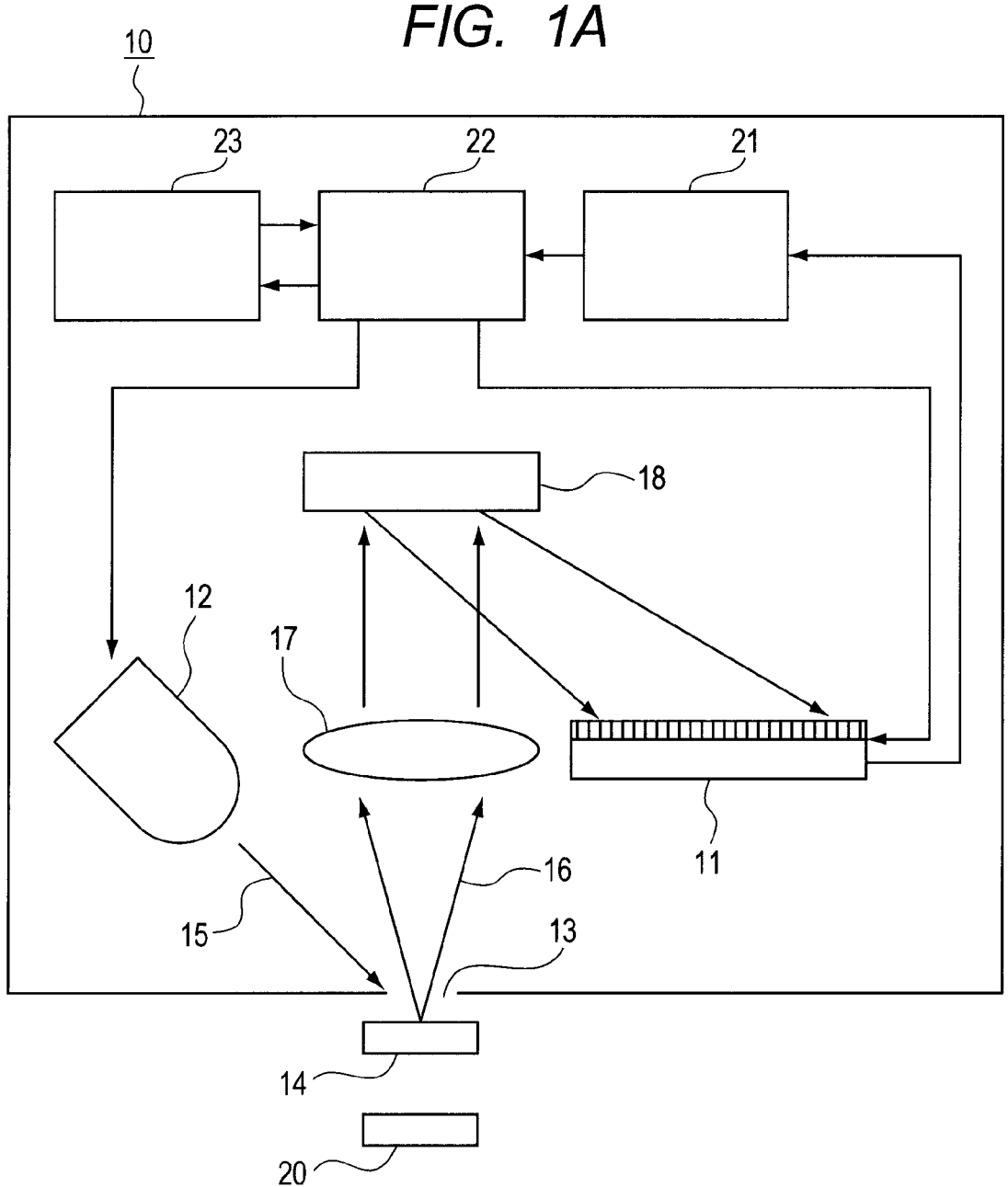
FIGS. 1A and 1B are schematic block diagrams illustrating the spectral color measurement device according to a first embodiment.
Figure 1B:
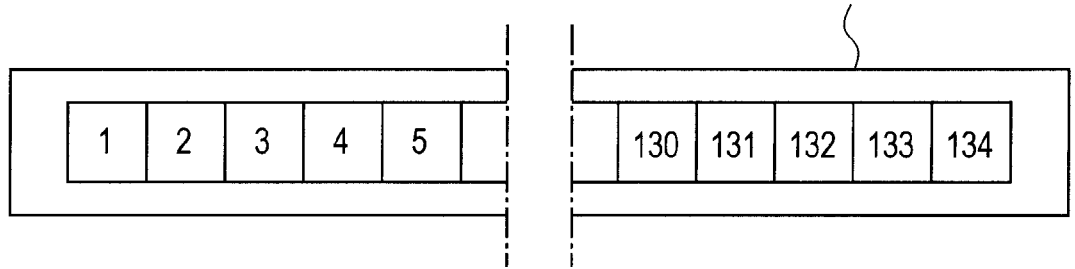

Schematic views of a spectral color measurement device according to a first embodiment are illustrated in FIGS. 1A and 1B. The spectral color measurement device 10 in FIG. 1A includes a white light source 12 having a luminescence wavelength distribution over the whole visible light, a condensing lens 17, a diffraction grating 18 and a charge-accumulation-type line sensor 11. The spectral measurement device according to the present embodiment includes a reference specimen 20 (hereinafter abbreviated as a white reference plate) for calibrating the output of the color measurement device, as is illustrated in FIG. 1A.

Here, the white light source 12 is a light source which irradiates a color measurement object with white light. The diffraction grating 18 is a spectral unit which disperses the light reflected from the color measurement object. The line sensor 11 is a light detection unit formed of multiple pixels which generate an electric signal corresponding to the intensity of the light which has been dispersed by the diffraction grating 18.

Light 15 which has been emitted from the light source 12 passes through an opening 13, is incident on a color measurement object 14 formed on a recording material at an incident angle of approximately 45 degrees, and turns into scattered light according to light absorption properties of the color measurement object. A part of the scattered light 16 is taken in the lens 17 to turn into parallel light, and then is incident on the diffraction grating 18 at an incidence angle of 0 degree, thereby being dispersed. The dispersed light which has been dispersed is incident on the line sensor 11.

As is illustrated in FIG. 1B, here, the line sensor 11 includes 134 pixels which are necessary for detecting visible light having a wavelength of approximately 350 nm to approximately 750 nm in a unit of approximately 3 nm. Each pixel in the line sensor 11 outputs a voltage signal according to the intensity of the incident dispersed light. The output signal is subjected to AD conversion processing in an AD converter 21, and thereby the output signal of the light reflected from the color measurement object 14 can be obtained in a form of a digital intensity signal of each pixel. The line sensor 11 used in the present embodiment is a charge-accumulation-type line sensor, and each pixel therein outputs the voltage signal according to the intensity of the dispersed light which has been incident thereon in a predetermined period of accumulation time. The period of accumulation time can be appropriately controlled by the action of a control calculation part 22.

These digital intensity signals of each pixel are sent to the control calculation part (calculation unit) 22, and are calculated in the following way.

Each pixel in the line sensor has a corresponding wavelength λ previously associated with the address number n (n=1 to 134) thereof (in other words, values are mapped), and the result is retained in a memory unit 23. This value-mapping operation can be conducted with a conventionally well-known method, for instance, of using a reference single wavelength spectrum having a known wavelength when shipping the sensor, or the like.

When each pixel is thus associated with the wavelength λ, a wavelength-signal intensity spectrum Oi(λ) of the light reflected from the color measurement object 14 is obtained from the previously-described voltage signals output from each pixel.

Then, a spectral reflectivity Or(λ) of the color measurement object is determined from a wavelength-signal intensity spectrum Wi(λ) of the light reflected when a white reference plate 20 having a known spectral reflectivity is irradiated with the light of the white light source 12 and a spectral reflectivity Wr(λ) that the white reference plate itself has, which are separately measured, according to the following expression.

$$Or(\lambda) = \{Oi(\lambda)/Wi(\lambda)\} \times Wr(\lambda) \qquad \text{Expression (1)}$$

Furthermore, the calculation part 22 interpolation-calculates a spectral reflectivity in a wavelength zone that is equal to or more than 380 nm or that is equal to or less than 730 nm by every 10 nm, based on the obtained spectral reflectivity Or(λ), and outputs the spectral reflectivity to the outside.

When the color of the measurement object is measured with the spectral color measurement device of the present embodiment, firstly, the control calculation part replaces the wavelength λ expressed by the above-described expression (1) with a pixel address n, and calculates Oi(n)/Wi(n) for each pixel from the previously measured output signal Wi(n) of the white reference plate 20 and an output signal Oi(n) when the measurement object has been measured. The pixel address n represents the order of each pixel in the line sensor 11 illustrated in FIG. 1B. After that, a relationship between each pixel of the line sensor 11 and the wavelength, which have been associated with the present correction method, is read from the memory unit 23, the pixel address n is replaced with the wavelength λ, and Oi(λ)/Wi(λ) is obtained. Then, the value of Wr(λ) stored in the memory unit 23 is read, and the spectral reflectivity Or(λ) of the color measurement object can be obtained according to Expression (1).

Figure 2:
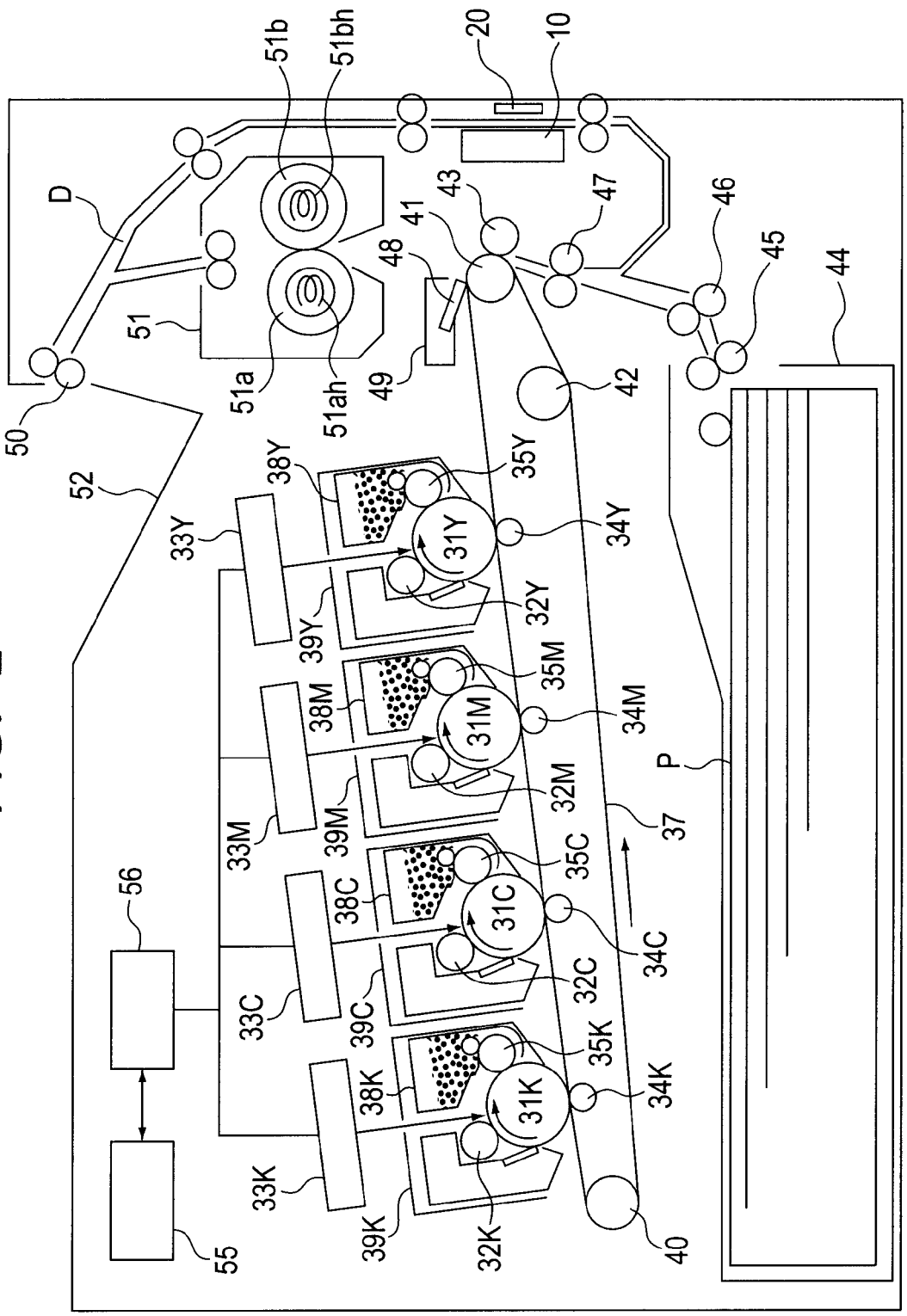
FIG. 2 is a schematic sectional view of an image forming apparatus using the spectral color measurement device according to the first embodiment.

The color measurement device of the present embodiment can be used, for instance, in an electrophotographic type of a color image forming apparatus, and FIG. 2 is a block diagram illustrating a tandem type of a color image forming apparatus which is an example of the electrophotographic type of the color image forming apparatus and adopts an intermediate transfer belt.

Firstly, the operation of an image forming portion of the image forming apparatus used in the present embodiment will be described below with reference to FIG. 2.

The image forming portion includes a feeding part 44; photosensitive members (hereinafter referred to as photosensitive member) 31Y, 31M, 31C and 31K for each station of each color of YMCK; charge rollers 32Y, 32M, 32C and 32K which work as primary charge devices; exposure scanners 33Y, 33M, 33C and 33K; developing devices 38Y, 38M, 38C and 38K which work as developing units; an intermediate transfer belt 37; a driving roller 41 for driving the intermediate transfer belt; a tension roller 40; an auxiliary roller 42; primary transfer rollers 34Y, 34M, 34C and 34K; a secondary transfer roller 43; a fixing unit 51; a control unit 55 for controlling and operating these components; and a controller 56.

The above-described photosensitive members 31Y, 31M, 31C and 31K are formed of an aluminum cylinder having an organic photoconductive layer applied onto its outer periphery and rotate by a driving force which is transmitted from a not-shown driving motor, and the driving motor makes the photosensitive members 31Y, 31M, 31C and 31K rotate in a clockwise direction according to an image forming operation.

When the above-described control unit 55 receives an image signal, a recording material P is sent out into the image forming apparatus from a feeding cassette 44 or the like by feeding rollers 45 and 46, is sandwiched once by a roller-shaped synchronous rotator for making an image forming operation, which will be described later, synchronize with the conveyance of the recording material P, specifically, a pair of conveyance (registration) rollers 47, stops there and waits.

On the other hand, the controller 56 makes exposure scanners 33Y, 33M, 33C and 33K form an electrostatic latent image on the surfaces of the photosensitive members 31Y, 31M, 31C and 31K which have been charged to a fixed potential due to the action of charge rollers 32Y, 32M, 32C and 32K, according to the received image signal.

The developing devices 38Y, 38M, 38C and 38K are units for visualizing the above-described electrostatic latent image, and perform development of yellow (Y), magenta (M), cyan (C) and black (K), in each station. Sleeves 35Y, 35M, 35C and 35K are provided in each development device, and a developing bias for visualizing the above-described electrostatic latent image is applied thereto.

Thus, the above-described electrostatic latent images which have been formed on the surfaces of the photosensitive members 31Y, 31M, 31C and 31K are developed as a monochrome toner image by the actions of the developing devices 38Y, 38M, 38C and 38K.

The photosensitive member 31, the charge roller and the developing device 38 for each color are integrated to form one piece, and are mounted in a form of a process cartridge 39 which is detachable from the main body of the image forming apparatus.

The intermediate transfer belt 37 comes in contact with the photosensitive members 31Y, 31M, 31C and 31K, and rotates in a counterclockwise direction when a color image is formed, while synchronizing with the rotation of the photosensitive members 31Y, 31M, 31C and 31K. The developed monochrome toner image is sequentially transferred onto the intermediate transfer belt by the action of a primary transfer bias which has been applied to the primary transfer roller 34, and forms a multicolor toner image on the intermediate transfer belt 37.

After that, the multicolor toner image which has been formed on the intermediate transfer belt 37 is conveyed to a secondary transfer nip part which is formed of the driving roller 41 and the secondary transfer roller 43. At the same time, the recording material P which has waited in a state of being sandwiched by the pair of conveyance rollers 47 is conveyed into the secondary transfer nip part by the action of the pair of conveyance rollers 47 while being synchronized with the multicolor toner image on the intermediate transfer belt, and the multicolor toner image on the intermediate transfer belt 37 is collectively transferred by the action of the secondary transfer bias which has been applied onto the secondary transfer roller 43.

The fixing unit 51 is a unit for melting the toner and fixing the transferred multicolor toner image while conveying the recording material P, and includes a fixing roller 51a for heating the recording material P and a pressurizing roller 51b for bringing the recording material P into close contact with the fixing roller 51a by pressurization.

The fixing roller 51a and the pressurizing roller 51b are formed to have a hollow shape, and contain heaters 51ah and 51bh therein, respectively.

The recording material P which retains the multicolor toner image thereon is conveyed by the fixing roller 51a and the pressurizing roller 51b, at the same time heat and pressure are applied thereto, and the toner is fixed thereon.

The recording material P on which the toner image has been fixed is discharged to a discharge tray 52 by a discharge roller 50, and the image forming operation ends. Alternatively, when an image is formed on a second page of the recording material P on which the toner image has been fixed, the recording material P passes through a double-sided conveyance path D by a switch back operation in a discharge part, is once sandwiched by the pair of conveyance (registration) rollers 47 again, stops there and waits. After that, the above-described series of the image forming operation is conducted, and the image is formed on the second page of the recording material P.

A cleaning unit 48 is a unit for cleaning a toner which has remained as a transfer residue on the intermediate transfer belt 37, and the transfer residual toner which has been collected here is stored as a waste toner in a cleaner container 49.

The color measurement device 10 of the present embodiment is arranged at a longitudinally middle position (at the middle position in the width direction perpendicular to the conveyance direction of the recording material) in the double-sided conveyance path, for the purpose of measuring the color of the toner patch which has been formed on the recording material P.

When the operation of the color measurement for the toner patch with the color measurement device 10 starts, firstly, the white reference plate 20 is moved by a not-shown cam to a position having the same position relationship as that between a toner patch image T, which will be described later, and the color measurement device 10, on the recording material P of which the color will be measured later. Then, the color of the white reference plate 20 is measured, the wavelength-signal strength spectrum $Wi(\lambda)$ is detected, and the above-described color measurement device is calibrated.

Figure 3:
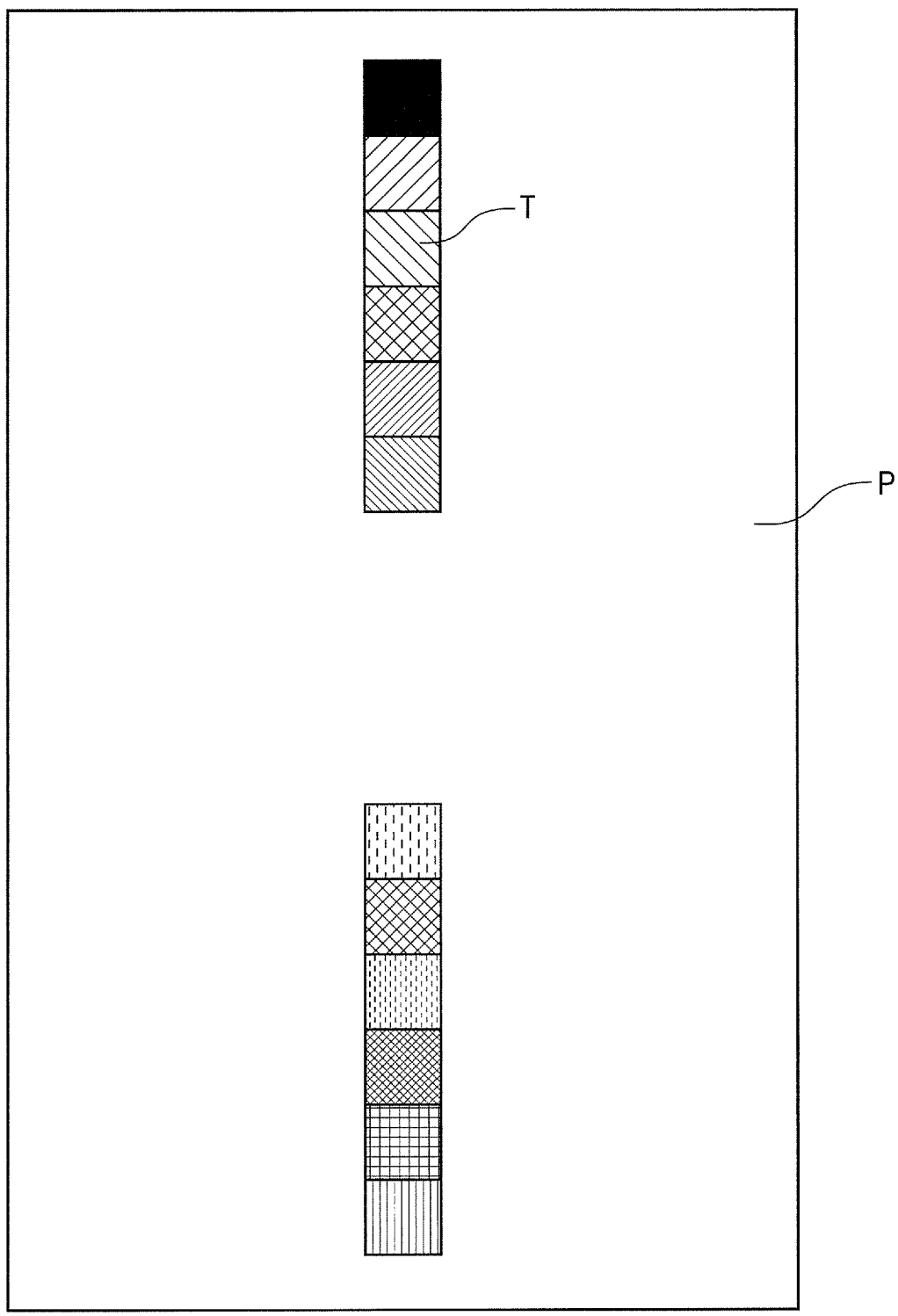
FIG. 3 is a view illustrating an example of a patch for color measurement.

Then, the patch image T for color measurement illustrated in FIG. 3 is formed on the recording material P, by the above-described series of the operation. The recording material P which has passed through the fixing unit is drawn to the double-sided conveyance path D by the switch back operation of the discharge part, and the color of the formed toner patch image T is sequentially measured with the color measurement device 10 arranged in the conveyance path, while being synchronized with the conveyance of the recording material P. After that, the recording material P which has passed through the pair of conveyance rollers 47 passes through a secondary transfer part/fixing unit, and is discharged to the discharge tray 52 by the discharge roller 50.

Such a series of the image forming operation is controlled by the control unit 55 provided in the image forming apparatus.

Next, an example of an image-processing operation in the image forming apparatus of the present embodiment will be described below with reference to a flow chart illustrated in FIG. 4 and a block diagram illustrated in FIG. 5.

The controller 56 and the control unit 55 of the image forming apparatus are connected to each other through a video interface, and the controller 56 is connected to a host computer 57 of an external terminal or to a not-shown network. A storage unit of the controller stores therein a color matching table (CM), a color separation table (C1) and a density correction table (C2) which are used for color conversion. In addition, the control unit 55 has the color measurement device 10, a CPU 202 which processes image formation and the result of the color measurement sent from the color measurement device 10, and a memory 203 which temporarily stores the measurement result mounted therein.

When the image forming operation starts, the controller 56 converts RGB signals which indicate the colors of an image sent from a host computer or the like to device RGB signals (hereinafter referred to as DevRGB) of which the colors are matched to a color reproduction region of the color image forming apparatus, by a color matching table (CM) which has been prepared beforehand (S131). Subsequently, the above-described DevRGB signals are converted to YMCK signals which are colors of toner color materials of the color image forming apparatus, by a color separation table (C1) and a color correction table (C2), which will be described later (S132). Then, the above-described YMCK signals are converted to Y'M'C'K' signals to which the correction in gradation/density characteristics has been added, by a density correction table (D) for correcting the gradation/density characteristics inherent to each color image forming apparatus (S133). Then, the resultant signals are subjected to half tone table processing, and are converted to Y"M"C"K" signals (S134). After that, the resultant signals are converted to the exposure periods of time Ty, Tm, Tc and Tk in the scanners (33C, 33M, 33Y and 33K), which correspond to the above-described Y"M"C"K" signals, by a PWM (Pulse Width Modulation) table (PW) (S135). The controller 56 controls the scanners 33 according to these exposure periods of time Ty, Tm, Tc and Tk, and thereby making electrostatic latent images formed on the surfaces of the photosensitive members 31Y, 31M, 31C and 31K, and the above-described series of the image forming operation is performed.

Figure 4:
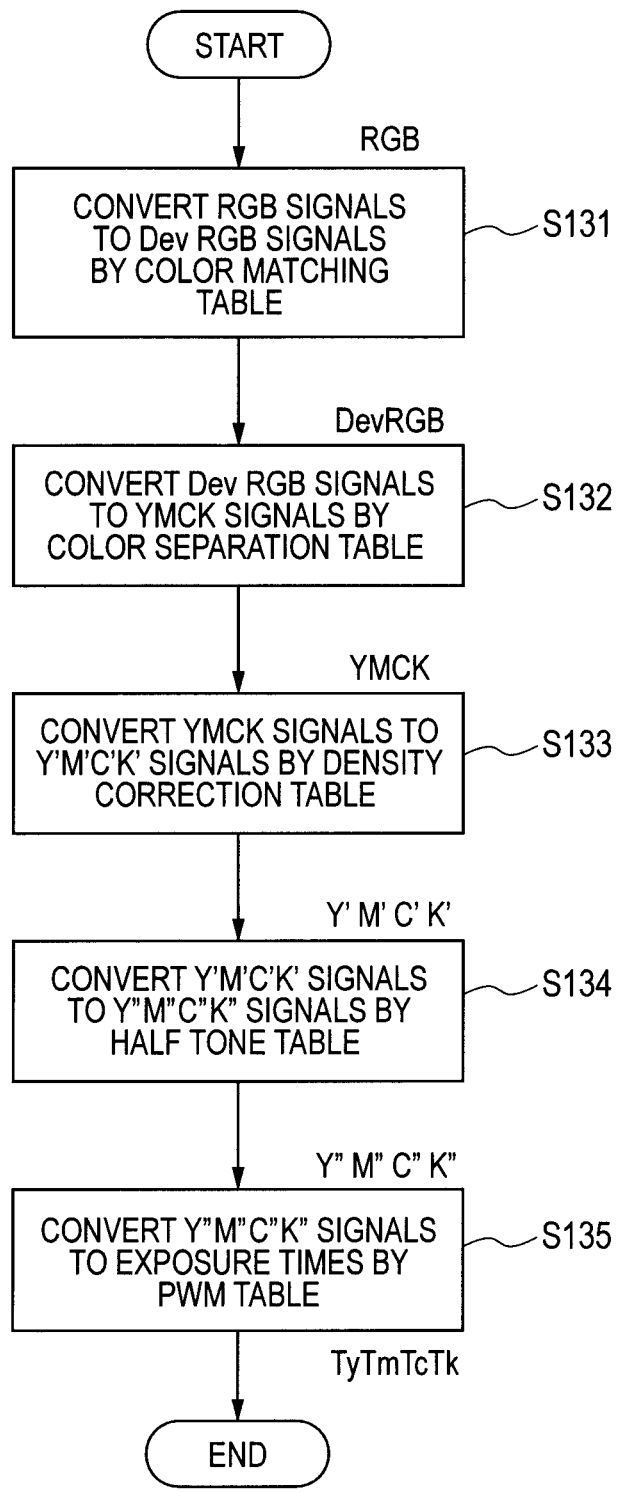
FIG. 4 is a flow chart illustrating an example of an image processing operation.

In addition, in the color measurement operation for the toner patch image by the color measurement device 10, a patch image T for color measurement illustrated in FIG. 3 is formed on the recording material P, according to a plurality of pieces of YMCK-types of the color patch data (CPD) which has been previously stored in the controller 56 as the color patch data, according to the processings in FIG. 4. The color of the patch image T for color measurement which has been formed on the recording material P is measured with the color measurement device 10, and a spectral reflectivity Or(λ) of each patch is read.

The read spectral reflectivity data is converted to color values (for instance, CIE L*a*b* or the like) by the action of the control unit 55, and is sent to a color conversion part of the controller 56. Then, the color values are converted to YMCK type of data (CSD) of which the color values depend on the image forming apparatus, by using a not-shown color management system (CMS) that the controller 56 has. After that, the above-described converted YMCK data (CSD) is compared with the default color patch data (CPD), and whereby such a correction table (C2) is generated as to correct a difference between both of the data.

All patches for color measurement, of which the colors have been measured, are subjected to these processings, but the patch of which the color is measured does not necessarily need to have all colors that can be reproduced by the image forming apparatus. Concerning the YMCK data which is not formed on the recording material P as the patch for color measurement, the correction table (C2) may be created by conducting interpolation processing based on the patch of which the color has been measured. The correction table (C2) which has been created in this way is data-updated and retained in the controller 56, together with the color separation table (C1).

For information, the image forming apparatus of the present embodiment employed an ISO12642 output target (IT8.7/3) which is frequently used when a printer profile is formed, as the default color patch data (CPD), and the color patch data of which the order was changed so as to be detected by the spectral color measurement device of the present embodiment was used as a toner patch T. Output matter having excellent color reproducibility can be obtained due to the above-described correction processing of the image forming apparatus.

Next, a white light source to be used in the present embodiment will be described in detail with reference to Exemplary Embodiments and Comparative Examples.

Exemplary Embodiment 1

Firstly, the white light source of Exemplary Embodiment 1 will be described below.

As described above, when the color of a color measurement object such as printed matter and object color is measured with a color measurement device in general, it is desired to measure the intensity in a wavelength zone that is equal to or more than 380 nm or equal to or less than 780 nm in strict color measurement or in a wavelength zone that is equal to or more than 400 nm to equal or less than 700 nm even in the case of simple color measurement, as is described in JIS Z8722, for instance.

Figure 6A:
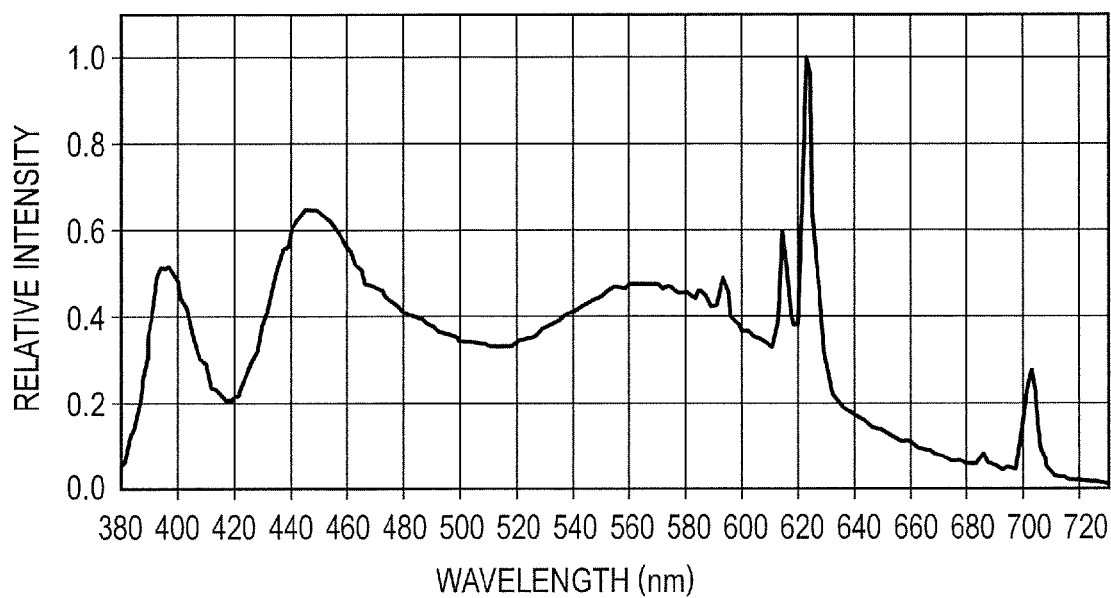
FIG. 6A is a spectrum view of an LED package used in Exemplary Embodiment 1.

Then, the white light source has a light-emitting diode having a peak value of emission intensity and a plural types of fluorescent members each having a peak value of fluorescence intensity, in the above-described predetermined wavelength zone. In the present exemplary embodiment, a white LED package (E1S40-1W0C6-01) made by Toyoda Gosei Co., Ltd. was used as the white light source 12. The luminescence spectrum of the present package light source has a shape formed by combining the spectrum of the light-emitting diode having a peak value of the emission intensity at 390 nm with a blue spectrum having a peak value of the fluorescence intensity at 450 nm, a yellow spectrum having a peak value of the fluorescence intensity at 570 nm and a red spectrum having a peak value of the fluorescence intensity at 630 nm, as is illustrated in FIG. 6A.

Figure 6B:
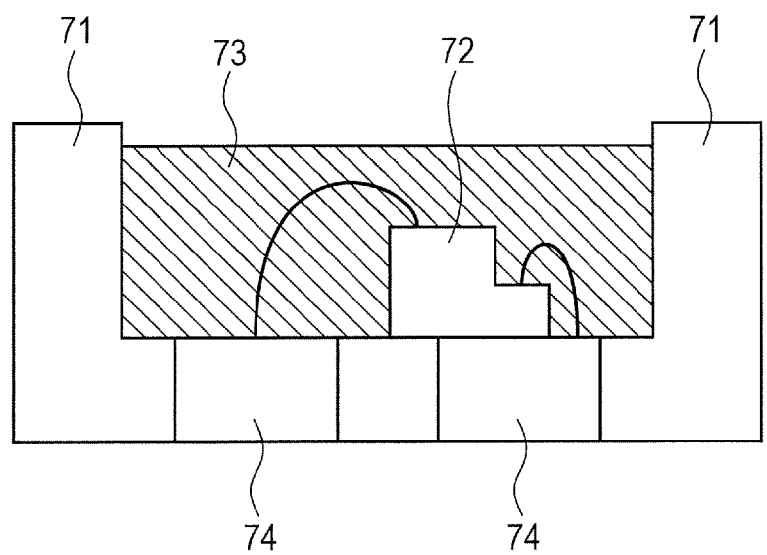
FIG. 6B is a schematic structure view of the LED package used in Exemplary Embodiment 1.

The LED package having such a luminescence spectrum is not limited to the above-described package used in the present exemplary embodiment. The LED package having the luminescence spectrum can be obtained in an arbitrary shape or type such as a surface mounting type, a shell type and a chip-on-board type, by combining a light-emitting chip (light-emitting diode) with a fluorescent member, similarly to a conventionally well-known package. A schematic structure view of a surface-mounting-type LED package is illustrated as a representative example, in FIG. 6B.

The surface-mounting-type LED package is obtained by mounting a light-emitting diode 72 in a cavity 71 which has been molded with a ceramic, a resin or the like, and filling the cavity 71 with a resin 73 such as epoxy and silicone, in which the fluorescent members have been dispersed. When an electric power is supplied to the light-emitting diode 72 through an electrode 74, the inherent wavelength spectrum that the light-emitting diode 72 itself has is emitted. A part of the emitted spectrum excites the fluorescent member in the cavity 71, and the inherent wavelength spectrum that the fluorescent member itself has is emitted. The luminescence spectrum as illustrated in FIG. 6A, which is used in the present exemplary embodiment, is emitted by using substances which emit each light of the previously-described blue, yellow and red as fluorescent members.

Thus, a spectral reflective output in the vicinity of 400 nm, which is necessary for color measurement and cannot have been sufficiently obtained in a general white LED, can be obtained by using the LED package which uses the light-emitting diode having a peak value of the emission intensity in a near-ultraviolet region, as the white light source 12. Specifically, the light-emitting diode having a peak value of the emission intensity in a wavelength zone that is equal to or more than 380 nm or equal to or less than 420 nm may be used as an excitation light source, in order to obtain an output in a wavelength zone that is equal to or more than 380 nm or in a wavelength zone that is equal to or more than 400 nm. An InGaN-based light-emitting diode can be adapted to such a light-emitting diode. Thereby, the precision of the color measurement for the signal in a wavelength region in which the output is low (region of wavelength in the vicinity of 400 nm or wavelength region of 410 nm or less) can be further enhanced.

In addition, a spectral reflective output in a region that is equal to or more than 400 nm or equal to or less than 700 nm necessary for simple color measurement can be obtained by using an LED package which uses a plural types of fluorescent members each having the peak value of fluorescence intensity in a wavelength zone of 420 nm to 730 nm, as is illustrated in the present exemplary embodiment as the white light source 12. Thereby, it becomes unnecessary to prepare a plurality of LED packages, and the precision of the color measurement in a wide wavelength zone can be further enhanced with a simple structure.

In this case, the composition of the fluorescent member to be used here is not limited in particular, but an oxide fluorescent member or a nitride fluorescent member can be used because of being chemically stable and prolonging the lives of a semiconductor light-emitting element and lighting equipment. The fluorescent member can be a member formed by combining a metal oxide represented by $Y_2O_3$, $Zn_2SiO_4$ and the like, a metal nitride represented by $Sr_2Si_5N_8$ and the like, a phosphate represented by $Ca_5(PO_4)_3Cl$ and the like, and/or a sulfide represented by ZnS, SrS, CaS and the like, with an ion of rare earth metals such as Ce, Pr, Nd, Pm, Sm, Eu, Tb, Dy, Ho, Er, Tm and Yb, or an ion of metals such as Ag, Cu, Au, Al, Mn and Sb, as an activation element or a coactivation element. These fluorescent members are components which are used as a conventionally well-known fluorescent member which includes a blue fluorescent member, a green fluorescent member, a yellow fluorescent member, an orange fluorescent member and a red fluorescent member.

In the present exemplary embodiment, a distance between a peak wavelength of emission intensity of an excitation light source and a peak wavelength of a spectrum of a blue fluorescent member was 60 nm. But if this distance is too narrow, another fluorescent member further needs to be added in order to secure sufficient output over a wavelength zone that is equal to or more than 400 nm, or equal to or less than 700 nm. On the other hand, when this distance is too wide, output in a region between two peak wavelengths results in being insufficient. For these reasons, it is desirable to set the distance between the peak wavelength of the emission intensity of the excitation light source and the peak wavelength of the fluorescent member spectrum in a short-wavelength side, at approximately 40 nm or more and 100 nm or less.

In addition, in the present exemplary embodiment, the distance between the peak wavelengths of spectra of the two fluorescent members was 120 nm and 60 nm, but it is desirable for the same reason to set the distance at approximately 40 nm or more and 150 nm or less. The reason why the distance between the peak wavelengths of spectra of the two fluorescent members can be permitted to be wider compared to the distance between the peak wavelength of the emission intensity of the excitation light source and the peak wavelength of the fluorescent member spectrum is because the fluorescent members are more easily selected from types having a broader spectrum width compared to the spectrum width of the excitation light source in general.

Comparative Example 1

Next, Comparative Example of a white light source will be described below in order to clarify an effect of the above-described white light source of Exemplary Embodiment 1.

Figure 9:
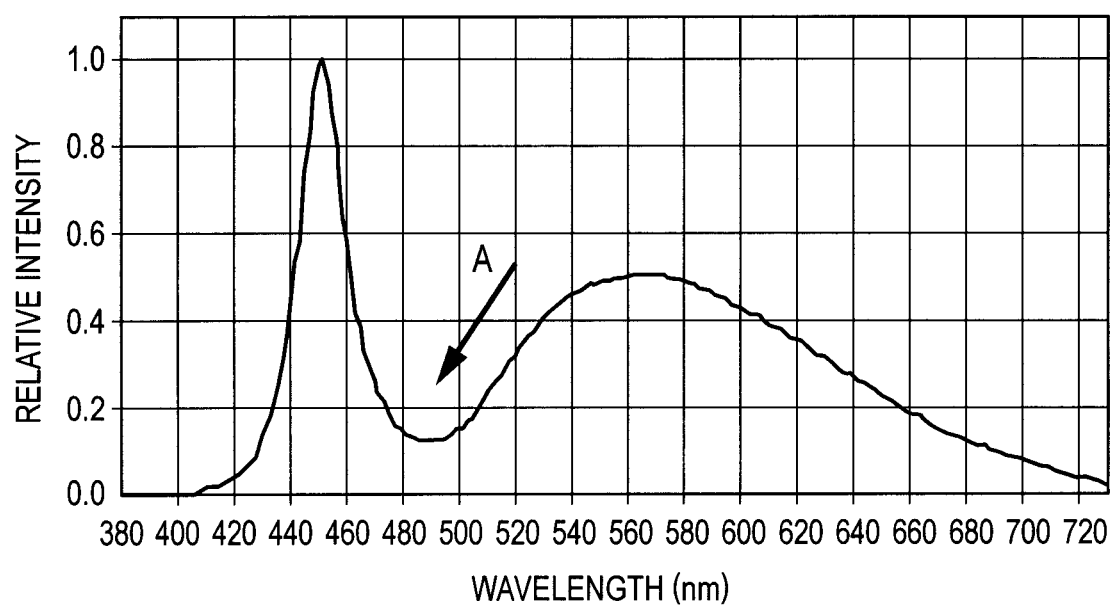
FIG. 9 is a spectrum view of the LED package used in Comparative Example 1.

In Comparative Example 1, a conventionally well-known general white LED package was used as the white light source 12. The luminescence spectrum of the present package light source has a shape formed by combining the spectrum of a light-emitting diode having a peak value of emission intensity at 450 nm, and a yellow spectrum having a peak value of fluorescence intensity at 570 nm, as is illustrated in FIG. 9. As is clear from the spectrum, the white LED package used in the present comparative example does not almost output light in a wavelength zone of 410 nm or less. Because there is a distance of 120 nm between the peak wavelength of the emission intensity of the excitation light source and the peak wavelength in a short-wavelength side of the fluorescent member spectrum, there is a valley between the outputs in the vicinity of 490 nm, and the output value in the same region results in being approximately 13% of the output at the maximum output region (450 nm).

Figure 7A:
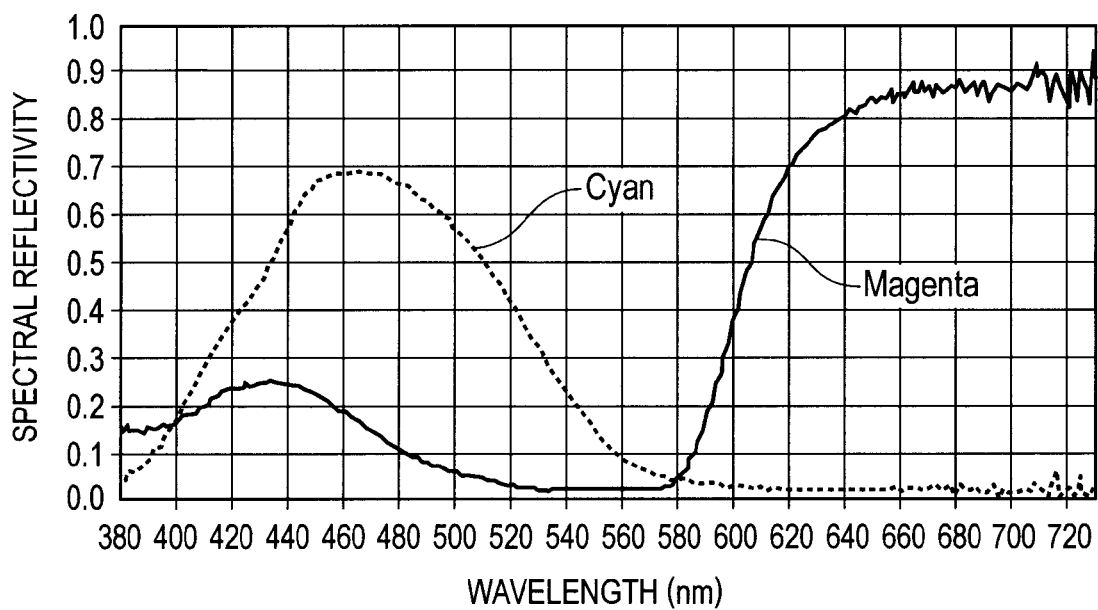
FIG. 7A is a view illustrating a result of color measurement obtained when the LED package in Exemplary embodiment 1 has been used.
Figure 7B:
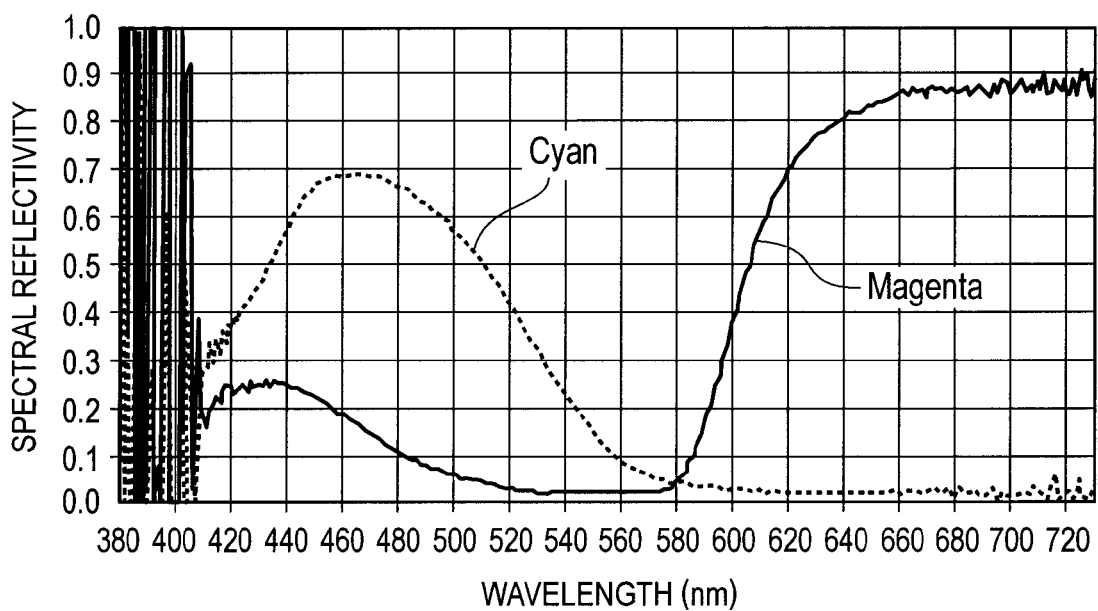
FIG. 7B is a view illustrating a result of color measurement obtained when an LED package in Comparative Example 1 has been used.

The above-described LED of Exemplary Embodiment 1 and LED of Comparative Example 1 were each set as the white light source of the spectral color measurement device illustrated in FIGS. 1A and 1B, and the color measurement values (spectral reflectivity) were compared. One example of thus obtained results is illustrated in FIG. 7A and FIG. 7B. FIGS. 7A and 7B are spectral reflectivity spectra (see Expression 1) obtained by measuring the colors of solid patch images of a cyan toner and a magenta toner which have been printed on the recording material by using the image forming apparatus illustrated in FIG. 2, with the spectral color measurement device using the respective LEDs.

As for the spectral reflectivity spectra obtained with the spectral color measurement device using the LED of Comparative Example 1, outputs in a long-wavelength side, in a short-wavelength side and in the vicinity of the 490 nm are affected by a noise. On the other hand, as for the spectral reflectivity spectrum obtained with the spectral color measurement device using the LED of Exemplary Embodiment 1, the output in the long-wavelength side is slightly affected by the noise, but except the long-wavelength side, a stable spectrum shape is obtained in the whole wavelength region. This means that when the LED used in Comparative Example 1 is used, the light-receiving signal corresponding to a short-wavelength zone in which the luminescence output is low is in a low level and is easily affected by a noise, but that in contrast to this, when the LED of Exemplary Embodiment 1 is used, the sufficient light-receiving signal is obtained and the light-receiving signal resists being affected by the noise. According to the investigation of the present inventors, if the minimum intensity of the luminescence spectrum in a wavelength zone that is equal to or more than 400 nm, or equal to or less than 700 nm, which is necessary for color measurement, is 20% or more of the maximum intensity, the influence of the noise can be neglected.

As described above, according to Exemplary Embodiment 1, a sufficient light-receiving signal can be obtained for measuring the color over a wavelength region (400 nm to 700 nm) which is necessary for a simple color measurement device, and accordingly the color measurement device resists being affected by the noise and can stably measure the color. In addition, the spectral color measurement device using the LED of Exemplary Embodiment 1 was mounted on the image forming apparatus, the output color measurement patch was read, and an image forming condition was adjusted based on the result. As a result, output matter having excellent color reproducibility could be obtained.

Figure 5:
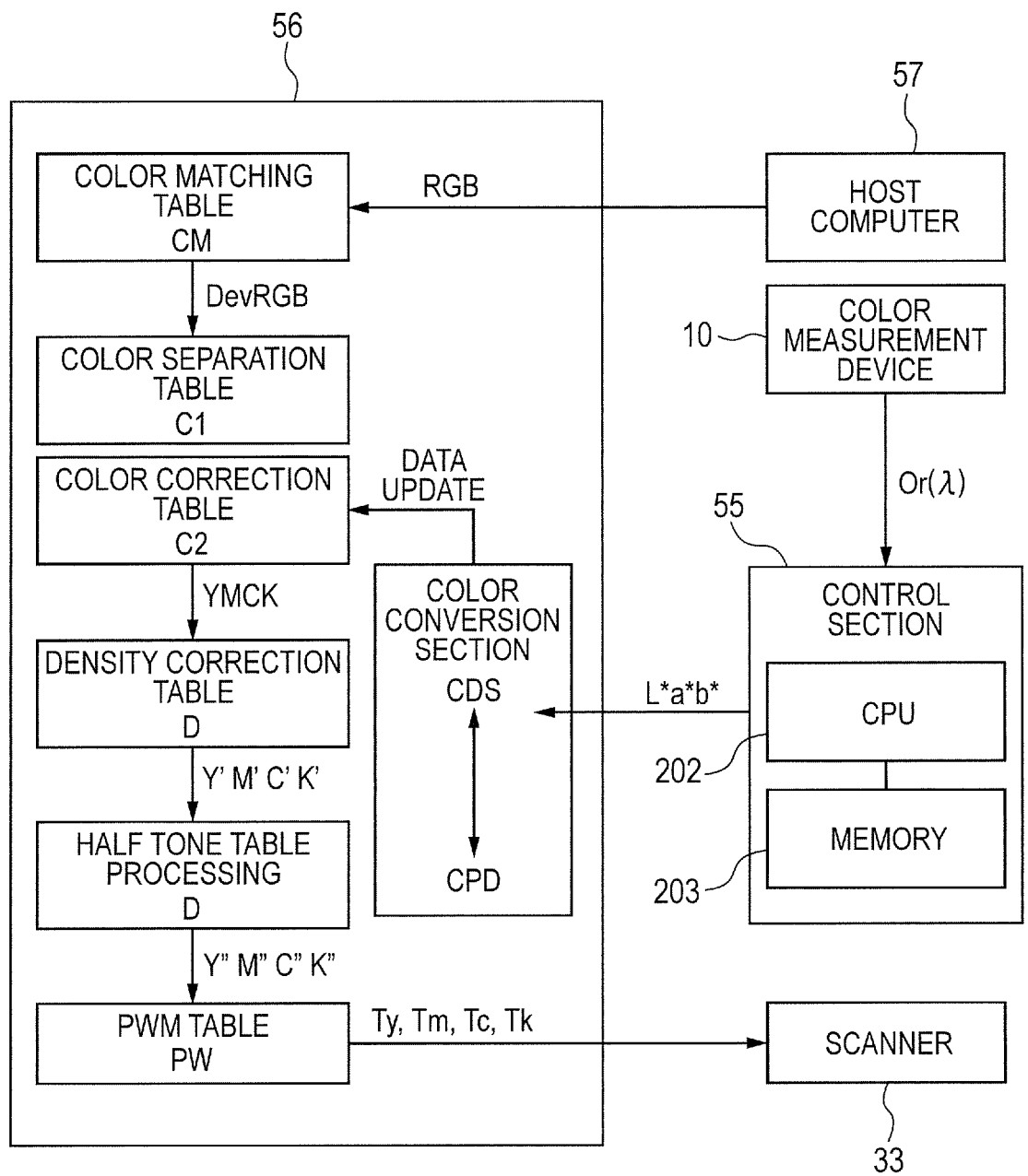
FIG. 5 is a block diagram illustrating an example of an image processing operation.

Here, the image forming condition is a color matching table, a color separation table, a color correction table or a density correction table, which are used, for instance, in color conversion illustrated in FIG. 5. The image forming conditions are adjusted (controlled) based on the result (color measurement condition) obtained by having read the above-described color measurement patch. To control the image forming conditions based on these color measurement conditions refers to reading the above-described color measurement patch, calculating a difference between the read value (measured color) and a desired color (original color of the above-described color measurement patch), and correcting the above-described table based on the calculated difference so that the image forming apparatus outputs the desired color.

Exemplary Embodiment 2

Next, a white light source of Exemplary Embodiment 2 will be described below.

In Exemplary Embodiment 2, a surface-mounting-type of LED package was prepared as the white light source by mounting an InGaN-based near-ultraviolet LED chip (with peak wavelength of 407 nm) on a ceramic cavity, pouring an epoxy resin dispersion of $(Ba,Eu)MgAl_{10}O_{17}$ (blue fluorescent member), ZnS:Cu,Al (green fluorescent member) and CaS:Eu (red fluorescent member) into the cavity, and curing the poured epoxy resin dispersion.

Figure 8A:
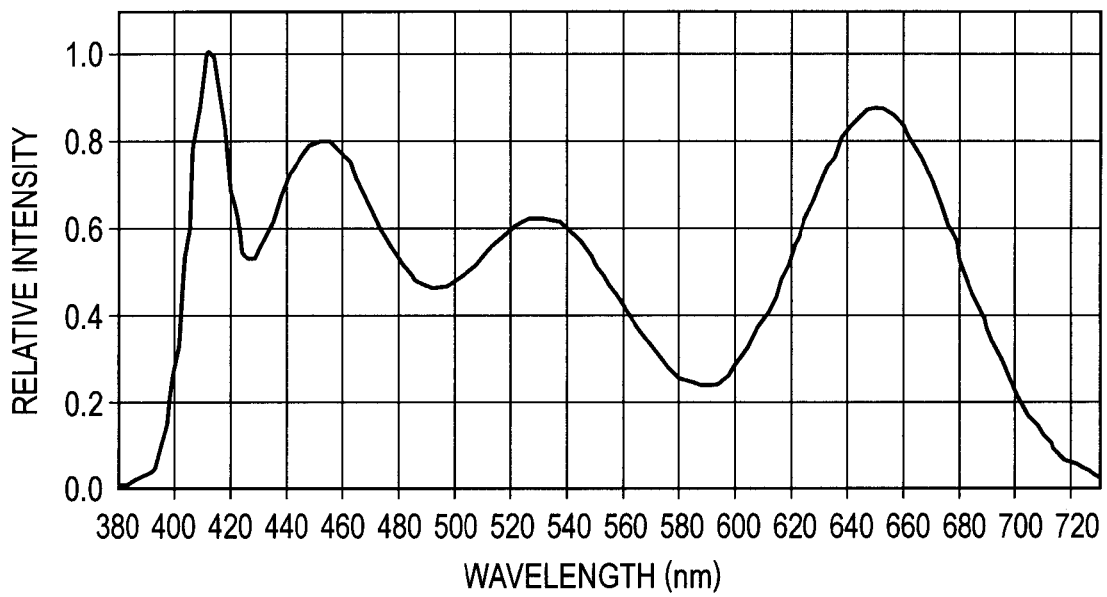
FIG. 8A is a spectrum view of an LED package used in Exemplary Embodiment 2.

The luminescence spectrum of the present package light source is as illustrated in FIG. 8A. The white light source sufficiently outputs the light in a short-wavelength region in the vicinity of 400 nm similarly to that in Exemplary Embodiment 1, and besides, can secure an output in a long-wavelength region of 630 nm or more, which is equal to or more than that in the spectrum obtained in Exemplary Embodiment 1. Furthermore, the white light source can secure 20% or more of the output at the maximum output region (450 nm), over the whole region that is equal to or more than 400 nm, or equal to or less than 700 nm.

Figure 8B:
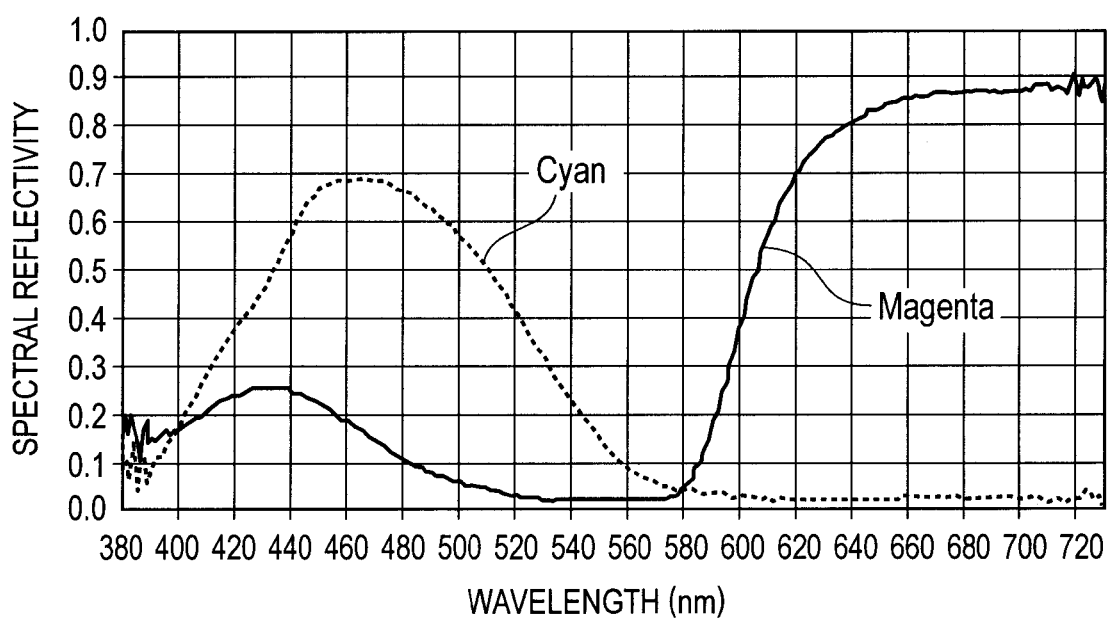
FIG. 8B is a view illustrating a result of color measurement obtained when the LED package in Exemplary Embodiment 2 has been used.

The LED package of Exemplary Embodiment 2 was set as the white light source of the spectral color measurement device illustrated in FIG. 1A and FIG. 1B, in a similar way to those in Exemplary Embodiment 1 and Comparative Example 1, and the colors were measured. One example of the color measurement values (spectral reflectivity) is illustrated in FIG. 8B. The color measurement values are spectral reflectivity spectra obtained by measuring the colors of solid patch images of a cyan toner and a magenta toner which have been printed on a recording material by using the image forming apparatus of Exemplary Embodiment 2, with the spectral color measurement device, as in the previous description. A stable spectrum shape is obtained over the whole wavelength region of 400 nm to 700 nm, which results in showing that a sufficient light-receiving signal is obtained in this region and whereby the light-receiving signal resists being affected by the noise.

As described above, the white light source according to the Exemplary embodiment 2 can secure 20% or more of the output at the maximum output region (450 nm) over the wavelength region (400 nm to 700 nm) which is necessary for the simple color measurement device. Thereby, the color measurement device can obtain a stable light-receiving signal enough to measure the color, resists being affected by a noise, and can stably measure the color. In addition, the spectral color measurement device using the LED of Exemplary Embodiment 2 was mounted on the image forming apparatus, the output color measurement patch was read, and an image forming condition was adjusted based on the result. As a result, output matter having excellent color reproducibility could be obtained. For information, the method of adjusting (controlling) the image forming conditions based on the result (color measurement condition) obtained by having read the above-described color measurement patch is as previously-described.

As described above, the white light source according to the present exemplary embodiment can further enhance the precision of the color measurement of the signal in a wavelength region (region of wavelength in the vicinity of 400 nm) in which output is low. In addition, the white light source can further enhance the precision of the color measurement with respect to a wide wavelength zone, with a simple structure. Specifically, the present exemplary embodiment can provide a color measurement device which uses a light source containing a light-emitting diode or a plural types of fluorescent members, is small and has excellent color measurement precision. The white light source can reduce the size of the color measurement device, and accordingly facilitates the color measurement device to be mounted on the image forming apparatus, and consequently the image forming apparatus can obtain output matter having excellent reproducibility of a color tone to the mounted color measurement device.

Second Embodiment

Figure 10A:
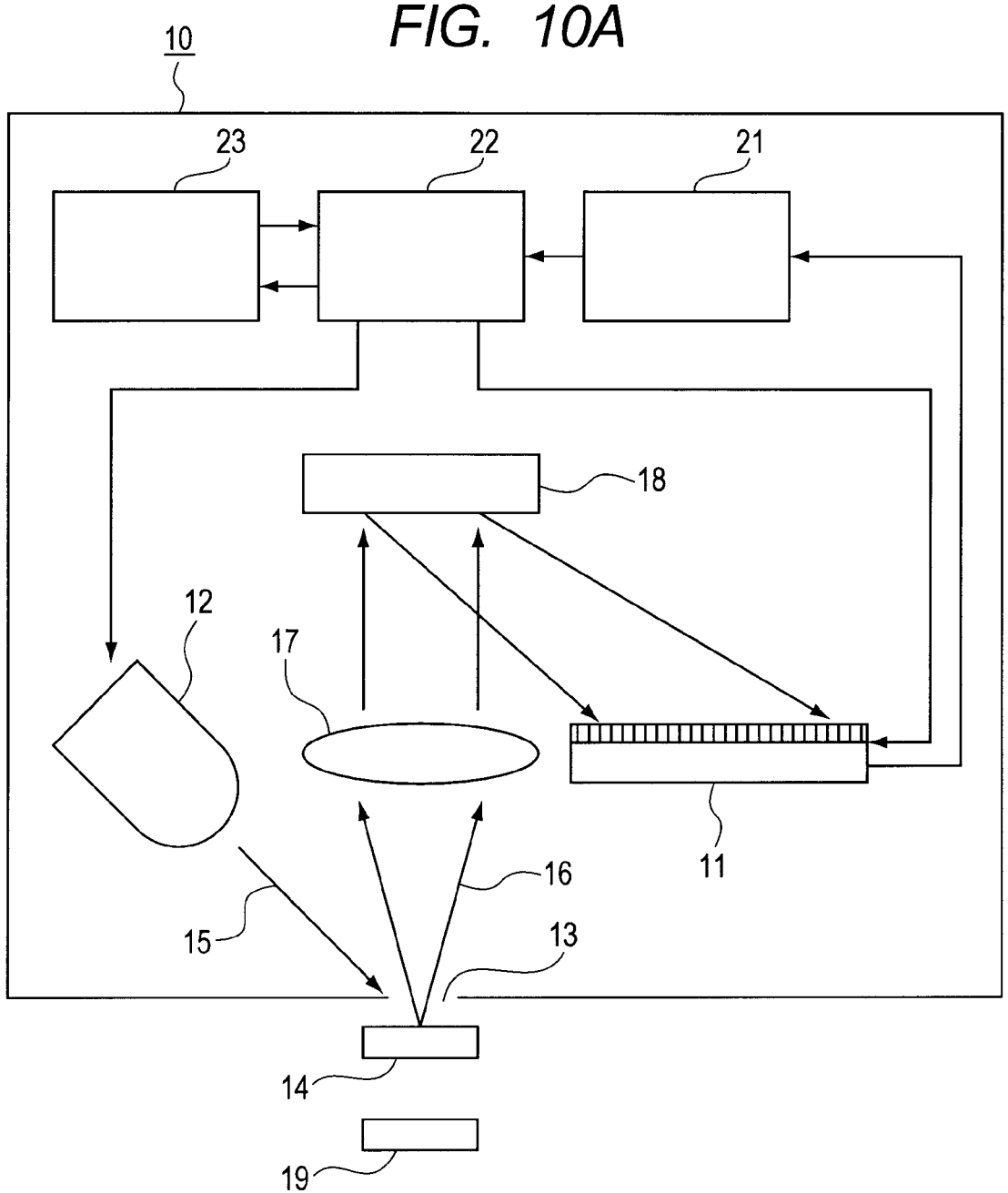
FIGS. 10A and 10B are schematic block diagrams illustrating the spectral color measurement device according to a second embodiment.
Figure 10B:
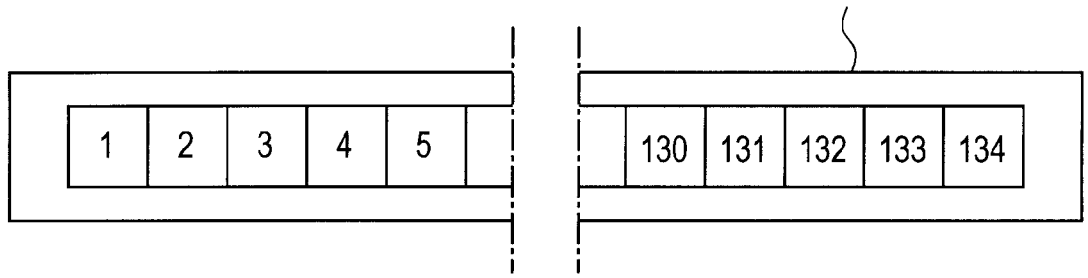

Schematic views of a spectral color measurement device according to a second embodiment are illustrated in FIGS. 10A and 10B. The spectral color measurement device 10 in FIG. 10A includes a white light source 12 having a luminescence wavelength distribution over the whole visible light, a condensing lens 17, a diffraction grating 18 and a charge-accumulation-type line sensor 11, similarly to the above-described first embodiment. The spectral measurement device according to the present embodiment includes a reference specimen 19 (hereinafter abbreviated as a white reference plate) for calibrating the output of the color measurement device, as is illustrated in FIG. 10A. This white reference plate 19 will be described later in detail.

For information, a usable white light source 12 that the spectral color measurement device according to the present exemplary embodiment has includes, for instance, a white LED, an LED of three-colors RGB and the like. Here, a white LED is used as the white light source, which is obtained by mixing blue, green and red fluorescent materials into a resin, and packaging the resultant resin in an LED element that emits blue light.

In the case of the spectral color measurement device according to the present exemplary embodiment as well, light 15 which has been emitted from the light source 12 passes through an opening 13, is incident on a color measurement object 14 formed on a recording material at an approximately 45° angle, and turns into scattered light according to light absorption properties of the color measurement object, similarly to the spectral color measurement device according to the above-described embodiment. A part of scattered light 16 is taken in the lens 17 to turn into parallel light, and then is incident on the diffraction grating 18 at a 0° incidence angle, thereby being dispersed. The dispersed light which has been dispersed is incident on the line sensor 11.

As is illustrated in FIG. 10B, here, the line sensor 11 includes 134 pixels which are necessary for detecting visible light having a wavelength of approximately 350 nm to approximately 750 nm in a unit of approximately 3 nm. Each pixel in the line sensor 11 outputs a voltage signal according to the intensity of the incident dispersed light. The output signal is subjected to AD conversion processing in an AD converter 21, and thereby the output signal of the light reflected from a color measurement object 14 can be obtained in a form of a digital intensity signal of each pixel. The line sensor 11 used in the present embodiment is a charge-accumulation-type line sensor, and each pixel outputs therein the voltage signal according to the intensity of the dispersed light which has been incident thereon in a predetermined period of accumulation time. The period of accumulation time can be appropriately adjusted by the action of a control calculation part 22.

These digital intensity signals of each pixel are sent to the control calculation part (calculation unit) 22, and are calculated in the following way.

Each pixel in the line sensor is previously associated with a corresponding wavelength λ (in other words, values are mapped), and the result is retained in a memory unit 23. This value-mapping operation can be conducted with a conventionally well-known method, for instance, of using a reference single wavelength spectrum having a known wavelength when shipping the sensor, or the like.

When each pixel is thus associated with the wavelength λ, a wavelength-signal intensity spectrum Oi(λ) of the light reflected from the color measurement object 14 is obtained from the previously-described voltage signals output from each pixel.

Then, a spectral reflectivity Or(λ) of the color measurement object under a light source r is determined from a wavelength-signal intensity spectrum Wi(λ) of the light reflected when the white reference plate 19 having a known spectral reflectivity is irradiated with the light of the white light source 12 and a spectral reflectivity Wr(λ) that the white reference plate itself has under the light source r, which are separately measured, according to the following expression.

However, the light source r employs an auxiliary illuminant D50 light source, in Standard illuminants (standard light) and standard light source, which is described in JIS 28720. However, the memory unit 23 has a relative spectral distribution table of the D50 light source and the standard light other than the D50 light source, and can calculate the spectral reflectivity of the color measurement object under an arbitrary light source.

$$Or(\lambda) = \{Oi(\lambda)/Wi(\lambda)\} \times Wr(\lambda) \quad \text{Expression (1)}$$

Furthermore, the calculation part 22 interpolation-calculates a spectral reflectivity in a wavelength zone of 380 nm to 730 nm by every 10 nm, based on the obtained spectral reflectivity Or(λ), and outputs the spectral reflectivity to the outside.

When the color of the color measurement object is measured with the spectral color measurement device of the present embodiment, firstly, the control calculation part replaces the wavelength λ expressed by the above-described expression (1) with a pixel address n, and calculates Oi(n)/Wi(n) for each pixel from the previously-measured output signal Wi(n) of the white reference plate 19 and an output signal Oi(n) when the color measurement object has been measured. The pixel address n represents the order of each pixel in the line sensor 11 illustrated in FIG. 10B. After that, a relationship between each pixel of the line sensor 11 and the wavelength, which have been associated with the present correction method, is read from the memory unit 23, the pixel address n is replaced with the wavelength λ, and Oi(λ)/Wi(λ) is obtained. Then, the value of Wr(λ) stored in the memory unit 23 is read, and the spectral reflectivity Or(λ) of the color measurement object can be obtained according to Expression (1).

Here, the meaning of the above-described expression (1) will be supplementarily described. Both sides of the above-described expression (1) divided by Wr(λ) equal the following expression (2).

$$Or(\lambda)/Wr(\lambda) = Oi(\lambda)/Wi(\lambda) \quad \text{Expression (2)}$$

Expression (2) specifically means that the reflective output ratio of the color measurement object 14 with respect to the white reference plate 19 does not change even under the white light source 12 of the spectral color measurement device according to the present exemplary embodiment and also under the light source r. In other words, it can be said that the control calculation part calibrates the output so that the reflectivity Oi(λ) of the color measurement object obtained with the luminescence spectrum of the white light source 12 turns into the reflectivity Or(λ) under the above-described standard light for color measurement, by using Wi(λ). Accordingly, to calculate the above-described Expression (1) by measuring the colors of the color measurement object 14 and the white reference plate 19 corresponds to calibrate the spectral color measurement device according to the present embodiment by using the white reference plate 19.

Figure 11:
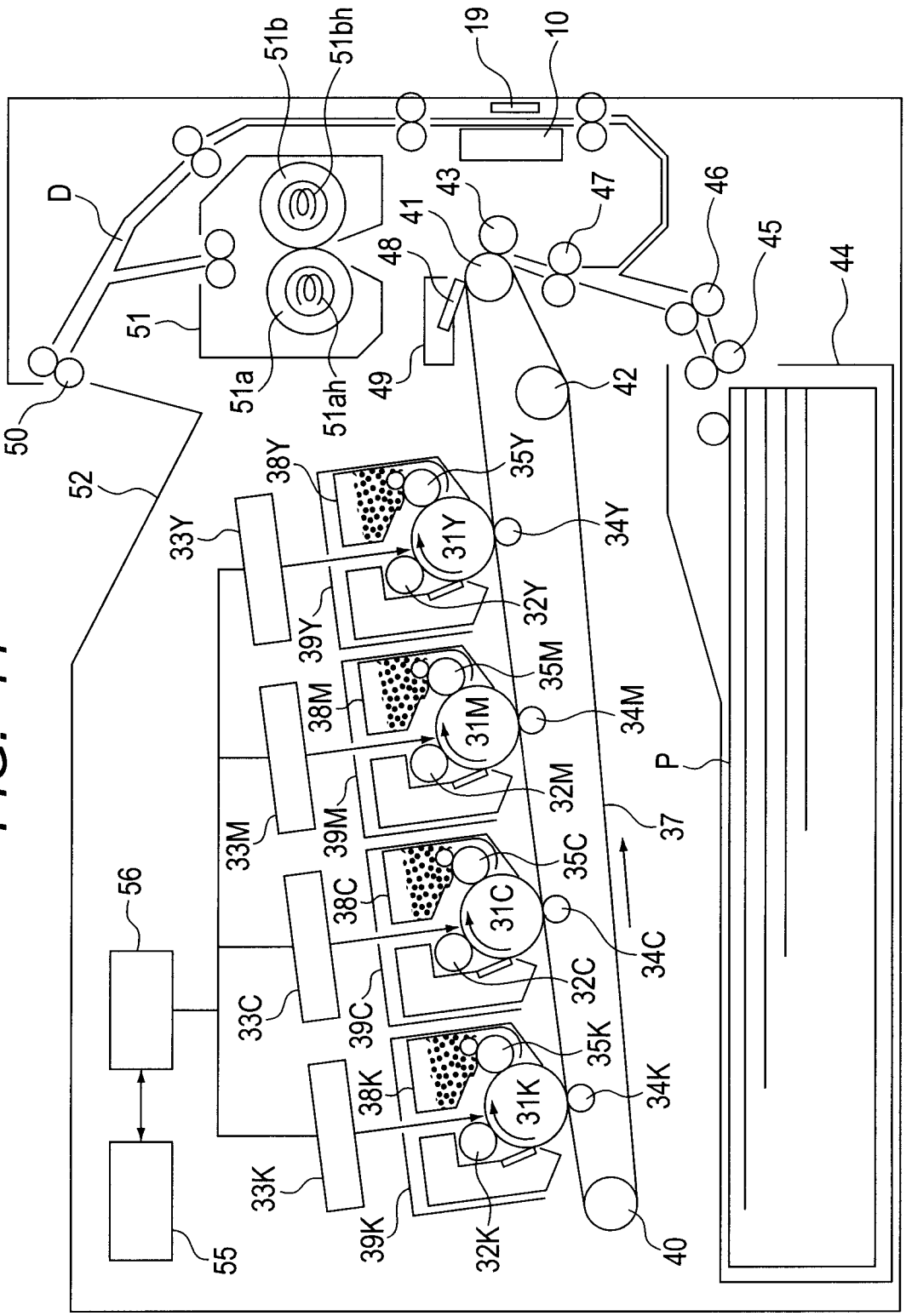
FIG. 11 is a schematic sectional view of an image forming apparatus using the spectral color measurement device according to the second embodiment.

The color measurement device of the present embodiment can be used, for instance, in an electrophotographic type of a color image forming apparatus, and FIG. 11 is a block diagram illustrating a tandem type of a color image forming apparatus which is an example of the electrophotographic type of the color image forming apparatus and adopts an intermediate transfer belt.

Firstly, the operation of an image forming portion of the image forming apparatus used in the present embodiment will be described below with reference to FIG. 11. The operation and the structure of the image forming apparatus of the present embodiment are the same as those of the image forming apparatus of the first embodiment which was described above with reference to FIG. 2, except for the white reference plate that the spectral color measurement device has. Accordingly, the members having the same functions are denoted by the same reference numerals and are described.

The image forming portion includes: a feeding part 44; photosensitive members (hereinafter referred to as photosensitive member) 31Y, 31M, 31C and 31K for each station of each color of YMCK; charge rollers 32Y, 32M, 32C and 32K which work as primary charge devices; exposure scanners 33Y, 33M, 33C and 33K; developing devices 38Y, 38M, 38C and 38K which work as developing units; an intermediate transfer belt 37; a driving roller 41 for driving the intermediate transfer belt; a tension roller 40; an auxiliary roller 42; primary transfer rollers 34Y, 34M, 34C and 34K; a secondary transfer roller 43; a fixing unit 51; a control unit 55 for controlling and operating these components; and a controller 56.

The above-described photosensitive members 31Y, 31M, 31C and 31K are formed of an aluminum cylinder having an organic photoconductive layer applied onto its outer periphery and rotate by a driving force which is transmitted from a not-shown driving motor, and the driving motor makes the photosensitive members 31Y, 31M, 31C and 31K rotate in a clockwise direction according to an image forming operation.

When the above-described control unit 55 receives an image signal, a recording material P is sent out into the image forming apparatus from a feeding cassette 44 or the like by feeding rollers 45 and 46, is sandwiched once by a roller-shaped synchronous rotator for making an image forming operation, which will be described later, synchronize with the conveyance of the recording material P, specifically, a pair of conveyance (registration) rollers 47, stops there and waits.

On the other hand, the controller 56 makes exposure scanners 33Y, 33M, 33C and 33K form an electrostatic latent image on the surface of the photosensitive members 31Y, 31M, 31C and 31K which have been charged to a fixed potential due to the action of the charge rollers 32Y, 32M, 32C and 32K, according to the received image signal.

The developing devices 38Y, 38M, 38C and 38K are units for visualizing the above-described electrostatic latent image, and perform development of yellow (Y), magenta (M), cyan (C) and black (K), in each station. Sleeves 35Y, 35M, 35C and 35K are provided in each development device, and a developing bias for visualizing the above-described electrostatic latent image is applied thereto.

Thus, the above-described electrostatic latent images which have been formed on the surfaces of the photosensitive members 31Y, 31M, 31C and 31K are developed as a monochrome toner image by the actions of the developing devices 38Y, 38M, 38C and 38K.

The photosensitive member 31, the charge roller and the developing device 38 for each color are integrated to form one piece, and are mounted in a form of a process cartridge 39 which is detachable from the main body of the image forming apparatus.

The intermediate transfer belt 37 comes in contact with the photosensitive members 31Y, 31M, 31C and 31K, and rotates in a counterclockwise direction when a color image is formed, while synchronizing with the rotation of the photosensitive members 31Y, 31M, 31C and 31K. The developed monochrome toner image is sequentially transferred onto the intermediate transfer belt by the action of a primary transfer bias which has been applied to the primary transfer roller 34, and forms a multicolor toner image on the intermediate transfer belt 37.

After that, the multicolor toner image which has been formed on the intermediate transfer belt 37 is conveyed to a secondary transfer nip part which is formed of the driving roller 41 and the secondary transfer roller 43. At the same time, the recording material P which has waited in a state of being sandwiched by the pair of conveyance rollers 47 is conveyed into the secondary transfer nip part by the action of the pair of conveyance rollers 47 while being synchronized with the multicolor toner image on the intermediate transfer belt, and the multicolor toner image on the intermediate transfer belt 37 is collectively transferred by the action of the secondary transfer bias which has been applied to the secondary transfer roller 43.

The fixing unit 51 is a unit for melting the toner and fixing the transferred multicolor toner image while conveying the recording material P, and includes a fixing roller 51a for heating the recording material P and a pressurizing roller 51b for bringing the recording material P into close contact with the fixing roller 51a by pressurization.

The fixing roller 51a and the pressurizing roller 51b are formed to have a hollow shape, and contain heaters 51ah and 51bh therein, respectively.

The recording material P which retains the multicolor toner image thereon is conveyed by the fixing roller 51a and the pressurizing roller 51b, at the same time, heat and pressure are applied thereto, and the toner is fixed thereon.

The recording material P on which the toner image has been fixed is discharged to a discharge tray 52 by a discharge roller 50, and the image forming operation ends. Alternatively, when an image is formed on a second page of the recording material P on which the toner image has been fixed, the recording material P passes through a double-sided conveyance path D by a switch back operation in a discharge part, is once sandwiched by the pair of conveyance (registration) rollers 47 again, stops there and waits. After that, the above-described series of the image forming operation is conducted, and the image is formed on the second page of the recording material P.

A cleaning unit 48 is a unit for cleaning a toner which has remained as a transfer residue on the intermediate transfer belt 37, and the transfer residual toner which has been collected here is stored as a waste toner in a cleaner container 49.

The color measurement device 10 of the present embodiment is arranged at a longitudinally middle position (at the middle position in the width direction perpendicular to the conveyance direction of the recording material) in the double-sided conveyance path, for the purpose of measuring the color of the toner patch which has been formed on the recording material P.

When the operation of the color measurement for the toner patch with the color measurement device 10 starts, firstly, the white reference plate 19 is moved by a not-shown cam to a position having the same position relationship as that between a toner patch image T, which will be described later, and the color measurement device 10, on the recording material P of which the color will be measured later. Then, the color of the white reference plate 19 is measured, the wavelength-signal strength spectrum Wi($\lambda$) is detected, and the above-described color measurement device is calibrated.

Then, the patch image T for color measurement illustrated in FIG. 3 is formed on the recording material P, by the above-described series of the operation. The recording material P which has passed through the fixing unit is drawn to the double-sided conveyance path D by the switch back operation of the discharge part, and the color of the formed toner patch image T is sequentially measured with the color measurement device 10 arranged in the conveyance path, while being synchronized with the conveyance of the recording material P. After that, the recording material P which has passed through the pair of conveyance rollers 47 passes through a secondary transfer part/fixing unit, and is discharged to the discharge tray 52 by the discharge roller 50.

Such a series of the image forming operation is controlled by the control unit 55 provided in the image forming apparatus. For information, an image processing operation in the image forming apparatus is similar to that described in the above-described embodiment with reference to FIG. 4 and FIG. 5, and accordingly the description will be omitted here.

Next, a white reference plate to be used in this embodiment will be described in detail with reference to an exemplary embodiment and a comparative example.

Figure 15:
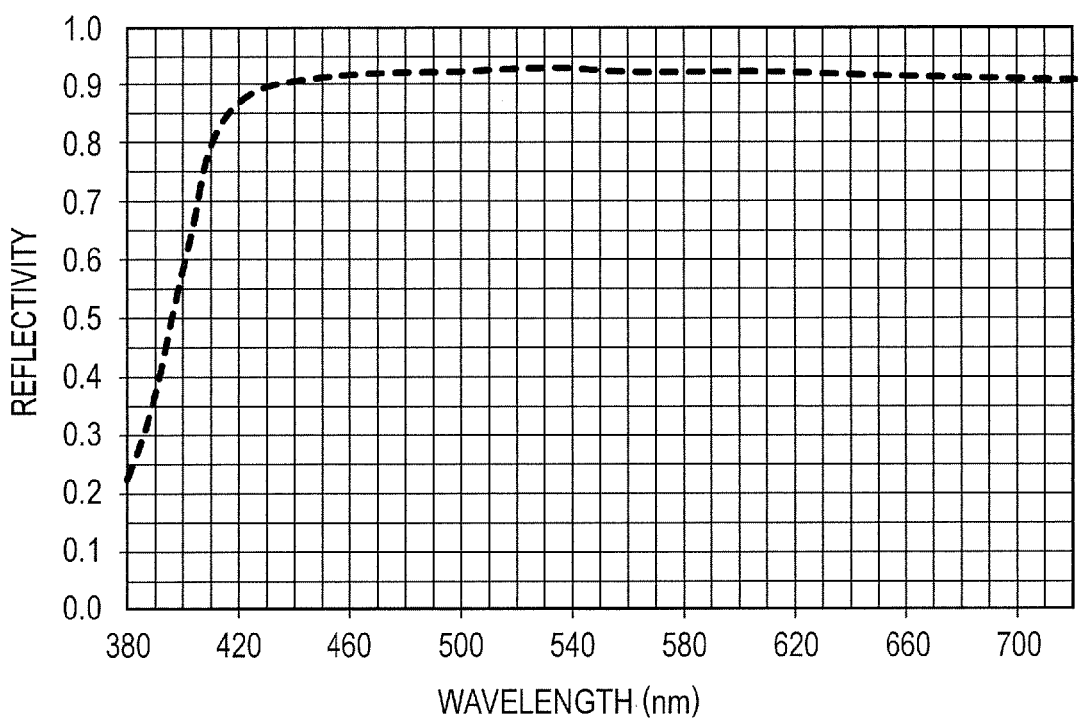
FIG. 15 is a spectral reflectivity view of a conventional white reference plate containing titanium oxide.
Figure 16:
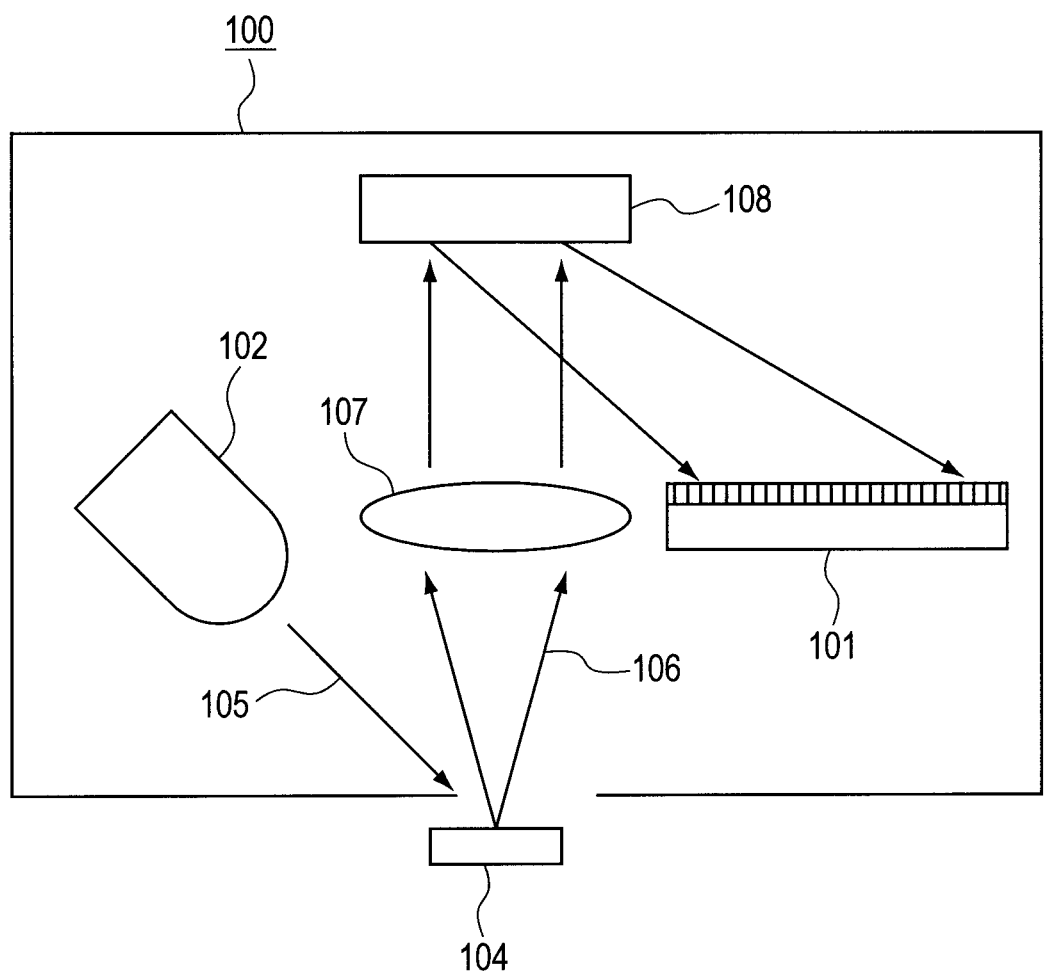
FIG. 16 is a view for describing a structure of a conventional spectral color measurement device.

Conventionally, when a color value or a spectral reflectivity of a color measurement object is actually measured with the use of the color measurement device, a reference specimen having a known color value or spectral reflectivity is measured beforehand, the device itself is calibrated so as to output the known color value or spectral reflectivity, and the color measurement object is measured. As for a general reference specimen, there is a tile which is a ceramic tile having a white glaze applied onto its surface layer, as is represented by the BCRA tile that is certified by British Ceramic Research Association (BCRA) and is described in Japanese Patent No. 4,541,529, for instance. In addition, in the simple color measurement device which outputs only the color value, a white resin sheet has been used which contains titanium oxide and has the spectral reflectivity, as is illustrated in FIG. 15.

However, the white tile of BCRA described in Japanese Patent No. 4,541,529 has the glaze applied to the surface, and accordingly results in showing inconsistencies of the color tone according to the position. Accordingly, if a positional precision between the device and the reference specimen is insufficient, an adequate measurement precision cannot be consequently obtained. In addition, the white tile has a large size compared to the detecting part of the device in consideration of just measuring the color tone of a printing image, which hinders the device from being miniaturized, and is not said to be effective in the cost as well. In addition, the reflectivity of the white resin sheet containing titanium oxide is remarkably decreased in a shorter wavelength side than 420 nm. Thereby, the S/N properties of the color measurement device in this wavelength region deteriorates, which has caused such a problem that the device cannot be stably and accurately calibrated.

In addition, due to the problem, the color measurement precision cannot be secured, and accordingly the stability of the color tone cannot be expected even if the color tone of the image is detected and the feedback is applied to process conditions of the image forming apparatus.

Then, an object of the present embodiment is to provide a color measurement device which has a reference specimen that is excellent in the uniformity of the specimen surface, enables the device to be miniaturized and has both the wavelength uniformity of the spectral reflectivity and the high reflectivity, and shows adequate color measurement precision, in addition to the advantages of the above-described embodiment. Another object is to provide an image forming apparatus which adequately reproduces the color tone by using the color measurement device having the above-described reference specimen.

Exemplary Embodiment 3

As described above, the white reference plate of the color measurement device is desired to be excellent in the uniformity of the specimen surface, enable the device to be miniaturized and have both the wavelength uniformity of the spectral reflectivity and the high reflectivity. In addition, when the color of a color measurement object such as printed matter and object color is measured with a color measurement device in general, it is desired to measure the intensity in a wavelength zone of 380 nm to 780 nm in strict color measurement or in a wavelength zone of 400 nm to 700 nm even in the case of simple color measurement, as is described in JIS Z8722, for instance.

Figure 12:
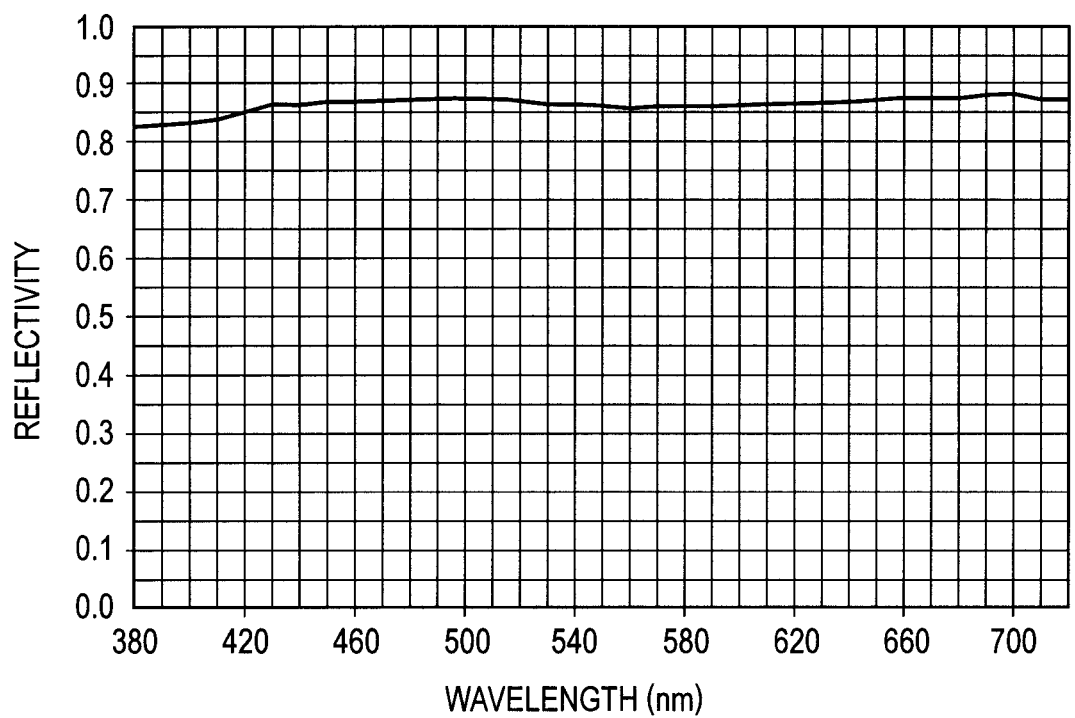
FIG. 12 is a spectral reflectivity view of a white reference plate used in Exemplary Embodiment 3.

Then, in Exemplary Embodiment 3, a white sintered body formed of alumina $Al_2O_3$ made by KYOCERA Corporation (material code A-476, alumina content of 96%) was used as the white reference plate 19. Here, the size of the white reference plate is as small as a length of 15 mm×a width of 15 mm×a thickness of 0.7 mm. The reason why alumina ($Al_2O_3$) was selected was because alumina is most commonly used in the industry among various ceramics and is inexpensive and procurable; on the other hand, is a bulk sintered body and can show high purity and high denseness, causes much scattered reflection in an element, shows uniform spectral reflectivity and has high reflectivity, in addition to the excellent uniformity of the surface; and is also so excellent in heat resistance as to be widely used as a substrate of an exothermic body of a fixing apparatus in an electrophotographic type of an image forming apparatus, and it was expected that alumina would cause little shape change by temperature rise in the image forming apparatus even if used in the apparatus as in the present exemplary embodiment. The spectral reflectivity of the white reference plate under a D50 light source is 0.8 or more in a wavelength zone of 380 nm to 700 nm, and shows a shape having high uniformity, as illustrated in FIG. 12. In addition, when the spectral reflectivity was measured, an aluminum plate which has been painted so as to be delustered uniform black was used as a backing member of the color measurement object, and a spectral color measurement device (Spectorolino) made by X-Rite, Incorporated was used.

Comparative Example 2

Next, Comparative Example 2 will be described for clarifying an effect of the above-described Exemplary Embodiment 3.

In Comparative Example 2, four types of white pigments of barium titanate ($BaTiO_3$), barium sulfate ($BaSO_4$), titanium oxide ($TiO_2$) and calcium carbonate ($CaCO_3$), and a plate of aluminum (Al) were used as the white reference plate 19.

Figure 13A:
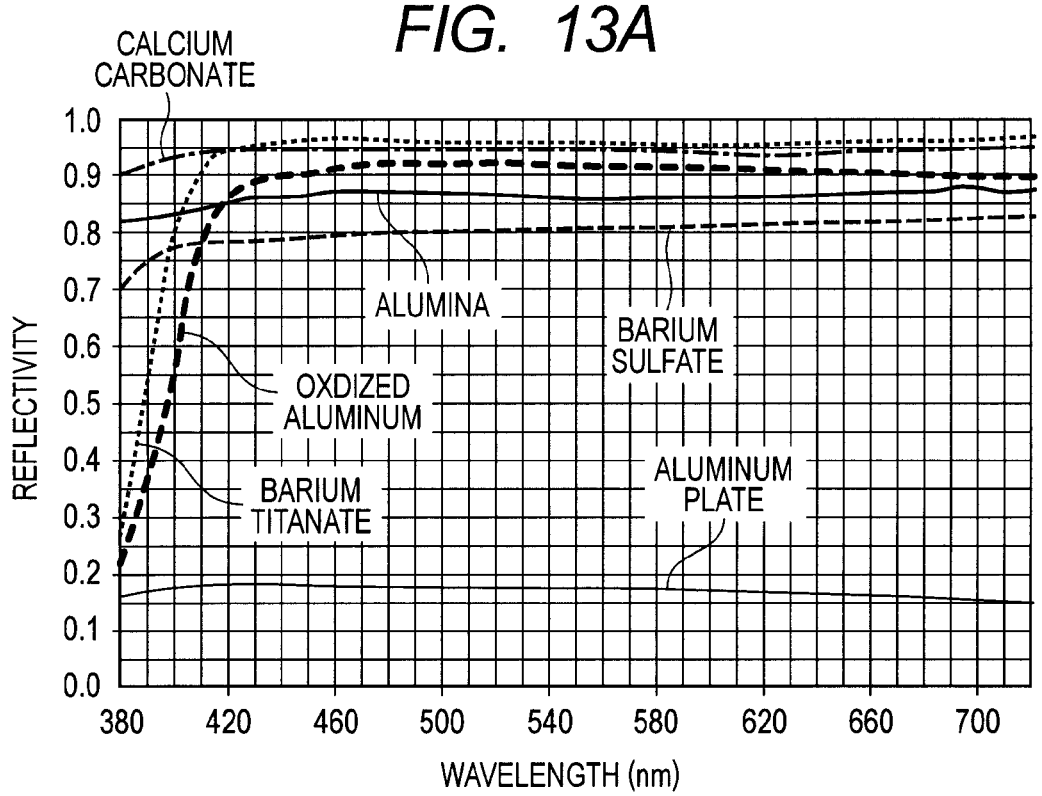
FIG. 13A is a spectral reflectivity view of white reference plates used in Exemplary Embodiment 3 and Comparative Example 2.

Results of the measurement of spectral reflectivities of the aforementioned materials including an alumina ($Al_2O_3$) sintered body are illustrated in FIG. 13A.

When attention is paid to the wavelength uniformity of the spectral reflectivity, it is understood that barium titanate ($BaTiO_3$) and titanium oxide ($TiO_2$) have steep absorption characteristics in the vicinity of 420 nm or in the shorter wavelength side. In addition, barium sulfate ($BaSO_4$) also has the same tendency from the vicinity of 390 nm. On the other hand, the aluminum plate (Al), alumina ($Al_2O_3$) and calcium carbonate ($CaCO_3$) show adequate wavelength uniformity. However, calcium carbonate ($CaCO_3$) was incompatible with the resin, became brittle when the content was increased to be whitened, and could not solve a problem in molding.

Figure 13B:
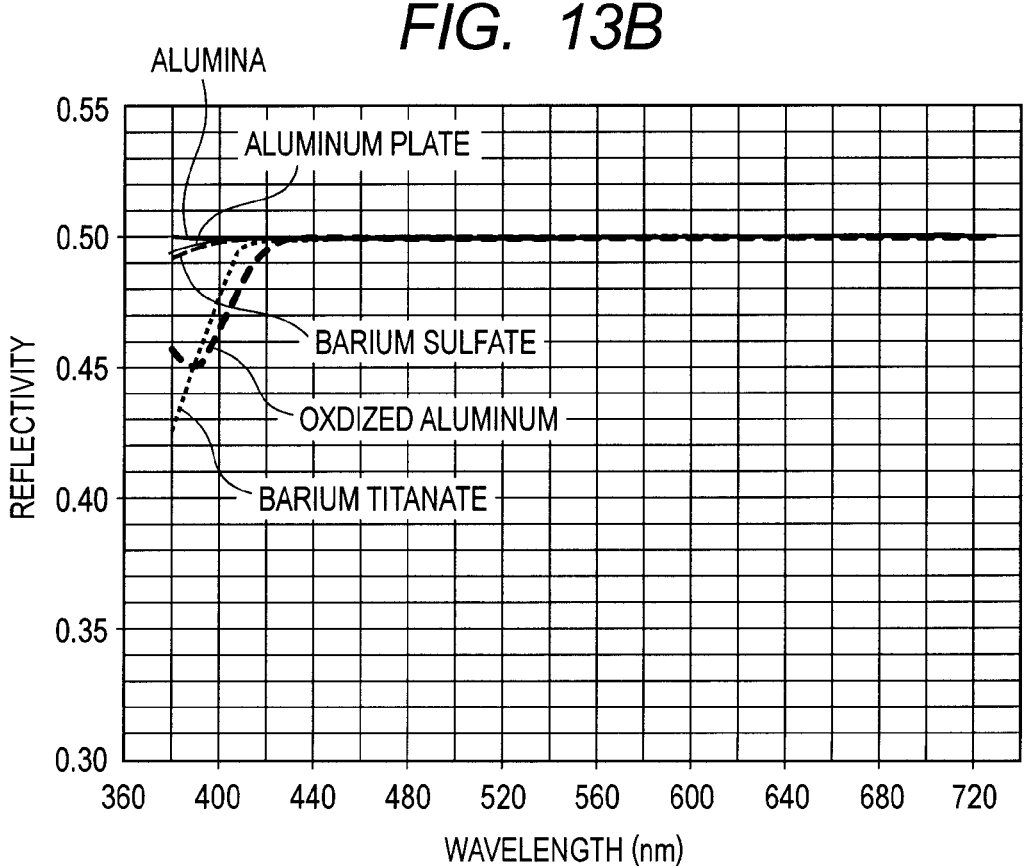
FIG. 13B is a view illustrating a result of color measurement of the white reference plates used in Exemplary Embodiment 3 and Comparative Example 2.

FIG. 13B is a view illustrating a result of color measurement for a color measurement object having an ideal spectral reflectivity of uniformly of 0.5 in a wavelength region of 380 nm to 730 nm, which has been conducted when wavelength deviation has occurred in the spectral color measurement device. The figure illustrates the spectral reflectivity which is measured when a relationship between each pixel of the line sensor 11 in Exemplary Embodiment 3 and the wavelength λ has been deviated uniformly by +2 nm (equivalent to deviation of one pixel or less of the line sensor 11). It is understood that the reflectivity of the material having more adequate wavelength uniformity clearly corresponds better to the reflectivity of the color measurement object. It is understood that in a wavelength zone of 400 nm to 700 nm in the case of the above-described simple color measurement, the reflectivity of barium sulfate is not almost affected by the deviation in the short-wavelength side, but as for barium titanate (BaTiO₃) and titanium oxide (TiO₂), the spectral reflectivities are not precisely determined and the precision deteriorates due to a slight error of measurement.

Figure 14:
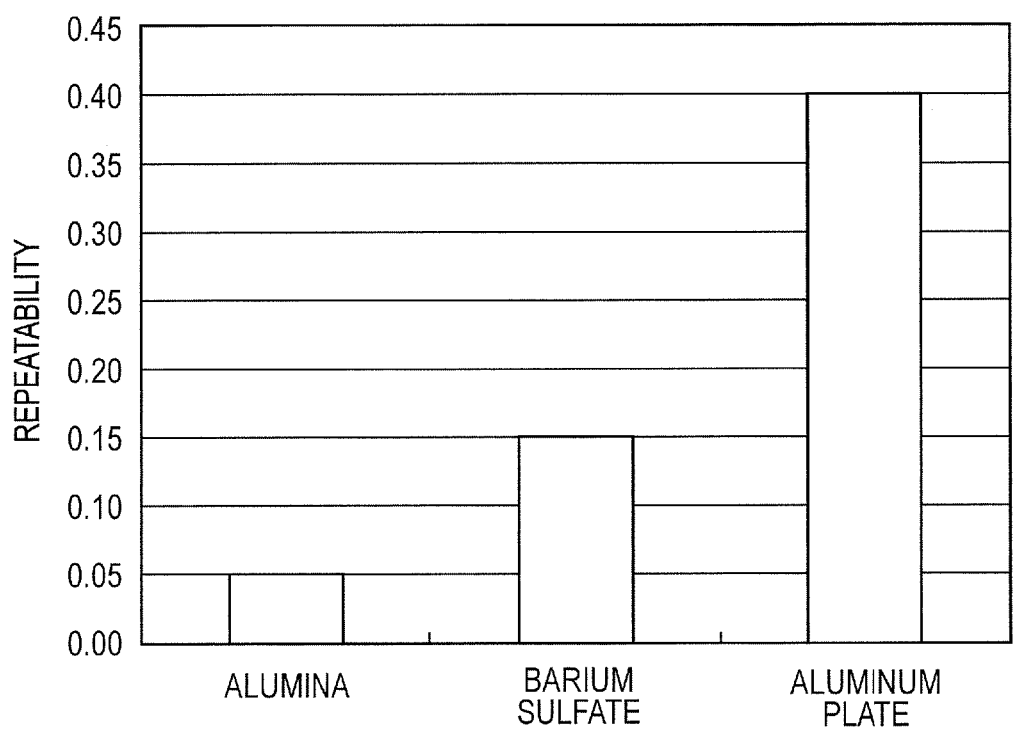
FIG. 14 is a view in which the precisions of the repeatabilities of a spectral color measurement device with respect to the reflectivities of white reference plates are compared.

Next, Results of having compared differences among spectral reflectivities of the reference plates will be described. FIG. 14 is a view in which precisions of repeatabilities of a spectral color measurement device with respect to the reflectivities of white reference plates are compared. As described above, the figure illustrates the results of having compared the precisions of repeatabilities on alumina ($Al_2O_3$), barium sulfate ($BaSO_4$) and the aluminum plate (Al) in which the color measurement results did not show remarkable deviation when the wavelength deviation occurred, with the color measurement device of Exemplary Embodiment 3. The precision of the repeatability is expressed by 6σ of CIE dE94 color difference between the average color value obtained by having measured the colors of each white reference plate 100 times repeatedly and each of the color values. As a result, the precision of repeatability was adequate in order of alumina ($Al_2O_3$), barium sulfate ($BaSO_4$) and aluminum plate (Al), which was the order of showing the high reflectivity as the white reference plate. It is considered that as the reflectivity of the white reference plate is higher, the color for the wavelength-signal strength spectrum $Wi(\lambda)$ of the white reference plate, which is a denominator of the above-described Expression (1), can be measured without deteriorating S/N properties. Generally, it is effective for the precision of the repeatability of the color measurement device to improve the S/N properties. For this purpose, it is effective to widen a range (dynamic range) in which a noise level can be lowered or the output is treated as a signal. The result illustrated in FIG. 14 shows that the higher the spectral reflectivity of the white reference plate to be used is, the more the dynamic range extends, the more S/N properties are improved, and the more effectively the precision of the repeatability is improved. It was found that an adequate result is obtained when the spectral reflectivity is approximately 0.8 or more in a wavelength zone of 380 nm to 730 nm.

As described above, such a result was obtained that the spectral color measurement device which used the alumina sintered body of Exemplary Embodiment 3 as the white reference plate was excellent compared to that of Comparative Example 2.

In the present exemplary embodiment, the alumina sintered body is used as the white reference plate, which is excellent in the uniformity of the specimen surface, can miniaturize the device, and has both the wavelength uniformity of the spectral reflectivity and the high reflectivity, and thereby the color measurement device resists being affected by noise and can stably measure the color. In addition, the color measurement device can be miniaturized, and accordingly can be easily mounted on the image forming apparatus. The spectral color measurement device using the white reference plate of the present exemplary embodiment was mounted on the image forming apparatus, the output color measurement patch was read, and an image forming condition was adjusted based on the result. As a result, output matter having adequate color reproducibility could be obtained. For information, the method of adjusting (controlling) the image forming conditions based on the result (color measurement condition) obtained by having read the above-described color measurement patch is as previously described.

Other Embodiment

For information, though the spectral type of color measurement device was illustrated and described as the color measurement device in the above-described embodiment, the present invention is not limited to the spectral type of color measurement device. For instance, the white reference plate may be applied to a filter type (tristimulus-value direct-reading type) of color measurement device which receives light reflected from the color measurement object with a photosensor through color filters with the color number of three colors of RGB or more and thereby measures the intensity of every color component. In addition, even in the spectral type of color measurement device, the white reference plate is not limited to a diffraction grating type of color measurement device which has been described in the embodiments, but can also be applied to a spectral color measurement device which uses a known spectral unit such as a prism.

In addition, the light-emitting diode and the fluorescent member illustrated in the embodiments are shown as one example of application. Other light-emitting diodes and fluorescent members which constitute the light source can be used, as long as the diodes and members satisfy the requirements of the present patent application.

In addition, the white reference plate illustrated in the embodiments shows one example of application, and a glass coat (hard to absorb light) which is transparent in the color measurement wavelength region may be applied to the material surface in consideration of a paper powder soil and scraping occurring on the white reference plate due to a long period of paper-threading time, or resistance to the heat caused by temperature rise in the image forming apparatus.

In addition, as for the image forming apparatus on which the color measurement device according to the present invention was mounted, an electrophotographic type of color image forming apparatus was illustrated and described in the embodiments, but the color measurement device according to the present invention can be mounted also on the existing image forming apparatuses such as an ink-jet type of image forming apparatus and a hot printing type of image forming apparatus, and thereby improving the reproducibility of the color tone.

In addition, in the above-described embodiments, the printer was illustrated as the image forming apparatus, but the present invention is not limited to the printer. For instance, the image forming apparatus may be other image forming apparatuses such as a copying machine and a facsimile machine, or other image forming apparatuses such as a complex machine in which these functions are combined. In addition, the image forming apparatus may also be an image forming apparatus which uses a recording material carrier and sequentially overlays and transfers toner images of each color onto the recording material carried by the recording material carrier. A similar effect can be obtained by applying the color measurement device according to the present invention to these image forming apparatuses.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-139471, filed Jun. 23, 2011, hereby incorporated by reference herein in its entirety.

What is claimed is:
1. A color measurement device comprising:
 a light source for irradiating a color measurement object with light;
 a spectral unit for dispersing the light reflected from the color measurement object; and a light detection unit including multiple pixels, the light detection unit generating an electric signal corresponding to the intensity of the light dispersed by the spectral unit, wherein the light source includes a light-emitting diode having a peak value of emission intensity in a near-ultraviolet region whose range is not less than 380 nm and not more than 420 nm, and a plural types of fluorescent members each having a peak value of fluorescence intensity in a wavelength zone that is not less than 420 nm, and not more than 730 nm, wherein the light source has a luminescence spectrum of which the lowest intensity in a wavelength zone that is equal to or more than 400 nm, or equal to or less than 700 nm is 20% or more of the maximum intensity.

2. A color measurement device according to claim 1, wherein a distance among each peak wavelength of the fluorescence intensities that the plural types of the fluorescent members is equal to or more than 40 nm, or equal to or less than 150 nm.

3. A color measurement device according to claim 1, wherein a distance between a peak wavelength of the emission intensity which the light emitting diode has and a peak wavelength of a short-wavelength side out of peak wavelengths of the fluorescence intensity of the fluorescent member is equal to or more than 40 nm, or equal to or less than 100 nm.

4. A color measurement device according to claim 1, further comprising:

a reference specimen for calibrating an output of the light detection unit, wherein the reference specimen is an alumina sintered body.

5. A color measurement device according to claim 4, wherein the reference specimen has a spectral reflectivity of 0.8 or more in a wavelength zone that is equal to or more than 380 nm, or equal to or less than 730 nm.

6. A color measurement device according to claim 5, further comprising:

a calculation unit for calculating a spectral reflectivity or a color value of the color measurement object by using a ratio of an output of the light detection unit for a reflection intensity of the reference specimen with respect to an output of the light detection unit for a reflection intensity of the color measurement object.

7. An image forming apparatus comprising:

an image forming portion for forming an image or a patch for color measurement corresponding to a signal on a recording material; and a color measurement device according to claim 1.

* * * * *